United States Patent [19]

Foster

[11] Patent Number: 5,427,229

[45] Date of Patent: Jun. 27, 1995

[54] CONTROL SYSTEM FOR RECIPROCATING FLOOR CONVEYOR

[76] Inventor: Raymond K. Foster, P.O. Box 1, Madras, Oreg. 97741

[21] Appl. No.: 309,264

[22] Filed: Sep. 20, 1994

[51] Int. Cl.⁶ ............................................. B65G 25/00
[52] U.S. Cl. .................................. 198/750.7; 91/176
[58] Field of Search .................... 198/750; 414/525.1; 137/596.15, 625.66; 91/176, 192

[56] References Cited

U.S. PATENT DOCUMENTS

| | | | |
|---|---|---|---|
| 4,580,678 | 4/1986 | Foster | 198/750 |
| 4,712,467 | 12/1987 | Foster | 91/176 |
| 4,748,893 | 6/1988 | Foster | 91/176 |
| 4,748,894 | 6/1988 | Foster | 91/176 |
| 4,793,468 | 12/1988 | Hamilton et al. | 198/750 |
| 4,821,868 | 4/1989 | Foster | 198/750 |
| 4,962,848 | 10/1990 | Foster | 198/750 |
| 5,103,866 | 4/1992 | Foster | 137/596.15 |
| 5,193,661 | 3/1993 | Foster | 198/750 |
| 5,228,555 | 7/1993 | Hallstrom | 198/750 |
| 5,355,995 | 10/1994 | Foster | 198/750 |

OTHER PUBLICATIONS

Two-page Product Sheet entitled Vickers Pressure Relief Valves One-Page Product Sheet entitled Directional Control Valve; Compact Controls, Inc.

Primary Examiner—James R. Bidwell
Attorney, Agent, or Firm—Joan H. Pauly

[57] ABSTRACT

A plurality of drive motors are operated by fluid pressure for reciprocating the floor slats of a reciprocating floor conveyor. A switching valve alternately connects the forward and rear ends of the motors to pressure and return to reciprocate the slats. A forward and a rear control valve each has a closed position in which it blocks direct communication between the switching valve and all but one of the forward and rear ends, respectively. A four-way valve has ports communicating with pressure and return and with the pilot chambers of the control valves. The four-way valve connects one pilot chamber to pressure and the other to return to cause the conveyor to convey a load in a first direction. Reversal of the pressure and return to the pilot chambers causes a reversal of the conveying direction. At least one forward end and one rear end of the motors has an internal control valve positioned to open and close a connecting passageway between adjacent motor ends.

16 Claims, 15 Drawing Sheets

CONTROL SYSTEM FOR RECIPROCATING FLOOR CONVEYOR

TECHNICAL FIELD

This invention relates to conveyor control systems and, more particularly, to such a system having a switching valve for alternately connecting forward and rear ends of drive motors to pressure and return to reciprocate floor slats, forward and rear control valves for blocking communication between the switching valve and selected motor ends, and a four-way valve for selectively communicating pilot chambers of the control valves to pressure and return to control the conveying direction of the conveyor.

BACKGROUND INFORMATION

The general concept of a reciprocating floor conveyor is well-known. There have been a number of patents issued disclosing various types of arrangements of drive motors and control systems for supplying the drive motors with pressurized fluid to reciprocate the floor slats of the conveyor and thereby convey a load. Reciprocating floor conveyors in which the control system supplies fluid to both ends of the motors are disclosed in the applicant's U.S. Pat. No. 4,712,467, granted Dec. 15, 1987; U.S. Pat. No. 4,748,893 and U.S. Pat. No. 4,748,894, both granted Jun. 7, 1988; U.S. Pat. No. 4,821,868, granted Apr. 18, 1989; and U.S. Pat. No. 4,962,848, granted Oct. 16, 1990.

SUMMARY OF THE INVENTION

The present invention relates to an improved control system for a reciprocating floor conveyor of a type having a plurality of floor slats and a plurality of fluid pressure operated drive motors for reciprocating the floor slats. Each motor has opposite forward and rear ends. According to an aspect of the invention, the system comprises a switching valve, forward and rear control valves, and a four-way valve. The switching valve alternately connects the forward and rear ends of the motors to pressure and return to reciprocate the floor slats. The forward control valve has a closed position in which it blocks direct communication between the switching valve and each of the forward ends other than a first forward end. The rear control valve has a closed position in which it blocks direct communication between the switching valve and each of the rear ends other than a first rear end. Each of the control valves has a pilot chamber. The four-way valve has first and second ports communicating with pressure and return, respectively. It also has third and fourth ports communicating with the pilot chambers of the forward and rear control valves, respectively. The four-way valve has first and second positions. In the first position, it connects one of the pilot chambers to pressure and the other of the pilot chambers to return to cause the conveyor to convey a load in a first direction. In the second position, it connects said one and said other of the pilot chambers to return and pressure, respectively, to cause the conveyor to convey a load in a second opposite direction. As used herein, the term "direct communication" with an end of a motor refers to a communication pathway that extends through a passageway or passageways but does not extend through another motor end before reaching the motor end in question.

The structure of the control valves may be varied. Preferably, each control valve comprises an elongated valve stem, and a piston and a valve plug carried by and spaced apart longitudinally along the stem. The piston and plug define a pressure chamber therebetween. The piston separates the pressure chamber from the pilot chamber of the control valve. The piston and plug having confronting pressure surfaces with differential pressure surface areas so that, when the pilot chamber is connected to pressure, the valve plug is seated to close the control valve, and when the pilot chamber is connected to return, the valve plug remains unseated to open the control valve. This preferred structure of the control valve has the advantage of being relatively simple and cost effective and of providing a valve that functions effectively and reliably.

The system of the invention may also include additional elements. Preferably, the system includes a bypass valve in combination with a shuttle valve. The shuttle valve is positioned between the bypass valve and the four-way valve. The bypass valve has a pressure chamber and a bypass passage interconnecting the pressure port and return port for the system. A bypass valve element has a closed position in which it closes the passage. The shuttle valve has a shuttle valve element freely movable by pressure in either one of the third and fourth ports of the four-way valve to open communication between said one of the third and fourth ports and the pressure chamber. This maintains the bypass valve element in its closed position during normal operation of the conveyor. The preferred structure of the shuttle valve includes first and second flow passageways and a center passageway. The flow passageways extend through the valve and communicate with the third and fourth ports of the four-way valve, respectively. The center passageway interconnects the flow passageways. An outlet port in the shuttle valve connects to the pressure chamber of the bypass valve and communicates with the center passageway between the flow passageways. The shuttle valve element is positioned in the center passageway and is freely movable into first and second opposite seated positions in which it closes communication between the outlet port and the first and second flow passageways, respectively. The shuttle valve element is movable by pressure in either one of the flow passageways to open communication between the flow passageway in which there is pressure and the outlet port. This supplies the pressure to the pressure chamber of the bypass valve.

A preferred feature of the invention is providing the switching valve, control valves, and four-way valve in further combination with forward and rear manifolds and internal control valves. The forward manifold is positioned adjacent to the forward ends of the motors and has a forward control passageway and a forward connecting passageway. The forward control passageway is connected to each of the forward ends. The connecting passageway extends between a first one of the forward ends and an adjacent one of the forward ends. The rear manifold is positioned adjacent to the rear ends of the motors and has a rear control passageway and a rear connecting passageway arranged in the same manner as the control and connecting passageways in the forward manifold. There is an internal control valve in each of the first forward end and the first rear end. The valve is positioned to open and close the connecting passageway. Preferably, the switching valve and the four-way valve are mounted on one of the manifolds, and the forward and rear pilot-operated control valves are integrated into the forward and rear manifolds, respectively. This allows the external fluid connections in the system to be minimized. As used herein, the term "external fluid connections" means a connection of a fluid conduit to an external surface of a manifold, valve body, or other structure, but does not include a connection that passes through adjacent abutting surfaces of two structures, such as a valve body or control block and a manifold.

It is anticipated that the control system of the invention will be used primarily in reciprocating floor conveyors having floor slats arranged in three sets and a plurality of groups, each group including three adjacent floor slats, one from each set. First, second and third fluid pressure operated drive motors are provided, one for each set. In such a conveyor, the system preferably comprises a connecting passageway in a forward manifold extending between each adjacent pair of forward motor ends. The rear manifold similarly includes a rear connecting passageway extending between each adjacent pair of rear motor ends. Four internal control valves are provided to open and close the connecting passageways. The internal control valves are provided in the forward ends of the first and second motors and the rear ends of the second and third motors. The forward pilot-operated control valve blocks communication between the forward control passageway and the forward ends of the second and third motors. The rear pilot-operated control valve blocks communication between the rear control passageway and the rear ends of the first and second motors.

The control system of the invention has a number of advantages over previous known control systems. The control system of the invention is highly durable and easy to maintain. The structure of the system and its components provide a compact control system configuration that makes the conveyor easier to install and more versatile with regard to the types of structures in which it can be installed. In addition, as noted above in connection with the preferred mounting arrangement, the system of the invention readily lends itself to minimization of external fluid connections. This, in turn, helps minimize the potential for fluid leaks in the system.

BRIEF DESCRIPTION OF THE DRAWINGS

In the drawings, like element designations refer to like parts throughout, and:

FIG. 7 is on the same scale as FIG. 6.

FIG. 9 illustrates the valve opened by pressure.

BEST MODE FOR CARRYING OUT THE INVENTION

Figure 1:
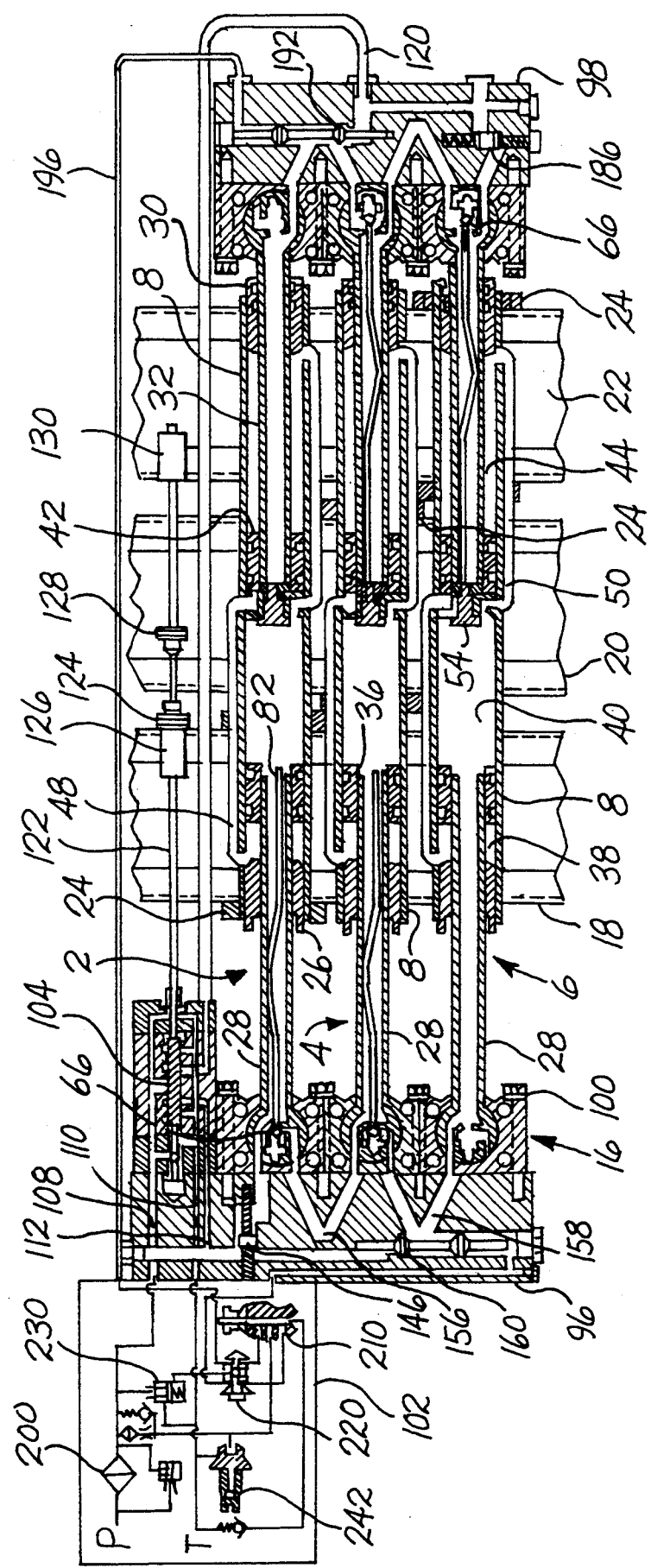
FIG. 1 is a partially schematic sectional view of the control system and associated drive motors of the preferred embodiment, showing the configuration of the system and motors at the beginning of the unload cycle in which a load is conveyed in a rearward direction.

The drawings show apparatus that is constructed according to the invention and that constitutes the best mode for carrying out the invention currently known to the applicant. The apparatus shown is a control system and portions of the drive system for a reciprocating floor conveyor.

The invention is intended to be used in a known type of reciprocating floor conveyor that includes a plurality of floor slats that are divided into sets and groups. There are three sets and a plurality of groups. Each group includes three adjacent floor slats, one from each set. The three floor slats in each group are moved together and then are retracted sequentially to move a load supported by the floor slats. The movement of the floor slats is accomplished by means of three linear hydraulic motors 2, 4, 6 that are positioned adjacent and parallel to each other.

As shown in the drawings, each motor 2, 4, 6 includes a cylinder component 8 and a piston component 10, 12. The motor 2, 4, 6 is operated to move the cylinder 8 relative to the piston 10, 12 along the motor axis. Each floor slat in the group is connected to its counterparts in the other groups by a transverse drive beam 18, 20, 22. Each floor member in the group is also secured to the movable cylinder component 8 of the corresponding motor 2, 4, 6. As shown in the drawings herein, this is accomplished by securing each transverse drive beam 18, 20, 22, to which the floor members in the group are secured to the cylinder component 8 of the corresponding motor 2, 4, 6. The movement of the floor slats to convey a load is described further in my U.S. Pat. No. 5,193,661.

The overall structure of each motor 2, 4, 6 can best be seen in FIGS. 1, 2, and 5–7. Referring to those figures, each motor 2, 4, 6 has a movable cylinder component 8 that is slidably received on a piston component 10, 12 of the motor 2, 4, 6. The piston component includes a forward piston portion 10 and a rear piston portion 12. Each of these portions 10, 12 has a ball 14 formed on its outer end. The balls 14 constitute the opposite outer ends of the motor 2, 4, 6, and each ball 14 is mounted in a ball block 16 to mount the motor 2, 4, 6 on support structure (not shown). An example of suitable support structure is disclosed in my U.S. patent application Ser. No. 08/164,895, filed Dec. 9, 1993, and entitled "Mounting Assembly and Method for Reciprocating Slat Conveyor". The cylinder 8 of each motor 2, 4, 6 is secured to its corresponding drive beam 18, 20, 22 by means of clamps 24, which may take any of various known forms.

Each cylinder component 8 includes a forward cylinder head 26 that slidably receives the rod 28 of the forward piston portion 10, and a rear cylinder head 30 that slidably receives the rod 32 of the rear piston portion 12. The piston rods 28, 32 are each tubular and define passageways or rod chambers 29, 33, respectively. The cylinder 8 is divided into two portions by a divider wall 34. In the forward portion of the cylinder 8, a forward piston head 36 slidably and sealingly engages the inner sidewall of the cylinder 8. A first annular chamber 38 is formed between the forward piston rod 28 and the cylinder sidewall. A second cylindrical chamber 40 is formed by the cylinder sidewall between the divider wall 34 and the forward piston head 36. This chamber 40 communicates with the rod chamber 29. Similarly, a rear piston head 42 slidably and sealingly engages the inner wall of the cylinder 8 rearwardly of the divider wall 34 and forms with the cylinder wall a third annular chamber 44. A fourth cylindrical chamber 46 corresponds to the forward cylindrical chamber 40 and communicates with the rear rod chamber 33. The two portions of the cylinder are connected by conduits 48, 50. The forward conduit 48 interconnects the forward first annular chamber 38 and the rear cylindrical chamber 46. The rear conduit 50 interconnects the forward cylindrical chamber 40 and the rear annular chamber 44.

The two-part configuration of the piston and cylinder components of the motors 2, 4, 6 allows the effective drive force of the motors to be increased without increasing the diameter of the motors. Since each annular chamber is interconnected with a cylindrical chamber, the drive forces in the two opposite directions are equal. The use of this type of motor configuration is known and has been described in my U.S. Pat. Nos. 4,712,467 and 4,821,868.

Referring to FIGS. 13–16, each motor 2, 4, 6 has a cushion bolt or snubber 54 to provide dampening of the end-of-stroke movement of the cylinder 8 and thereby reduce noise resulting from operation of the motor 2, 4, 6. The snubber is the subject matter of my U.S. patent application Ser. No. 08/161,663, filed Dec. 3, 1993, and entitled "Linear Hydraulic Motor with Snubber". The disclosure of that copending application is incorporated herein by reference. The snubber 54 will only be briefly described herein.

Figure 13:
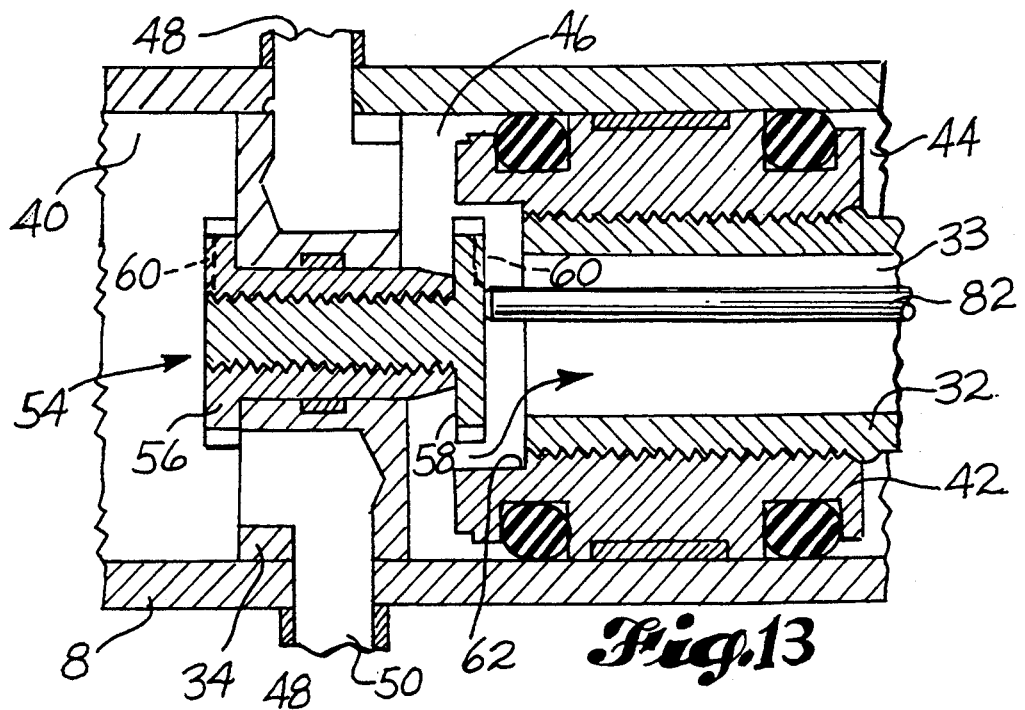
FIG. 13 is a sectional view of the center portion of the preferred embodiment of the motor illustrating the initial engagement of the push rod by the snubber.
Figure 14:
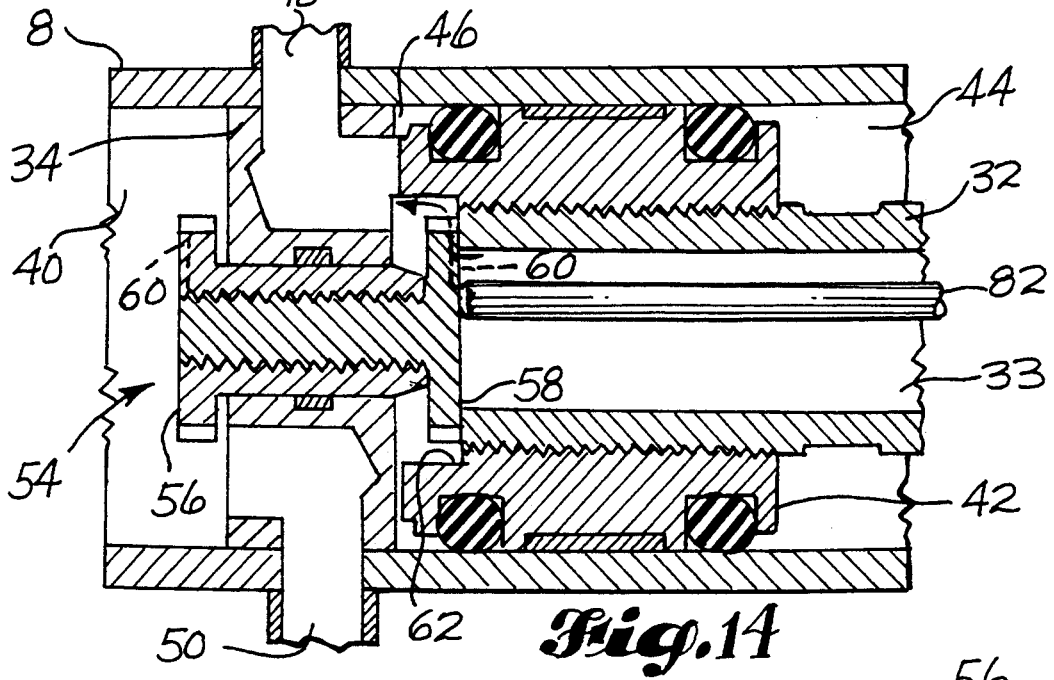
FIG. 14 is like FIG. 13 except that it illustrates the snubber and push rod after the snubber has displaced the push rod.
Figure 15:
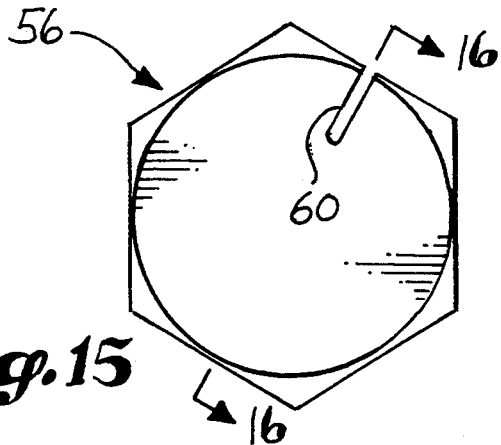
FIG. 15 is an end view of the preferred embodiment of the snubber shown in FIGS. 13 and 14.
Figure 16:
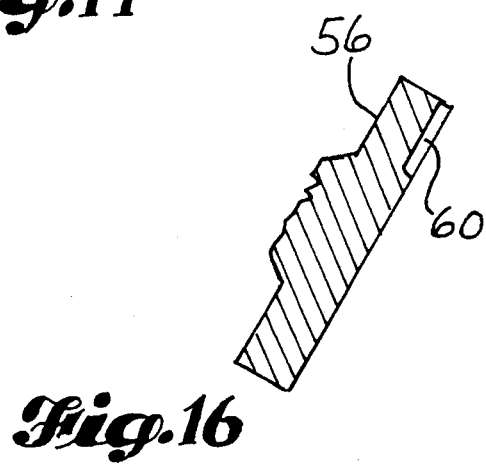
FIG. 16 is a fragmentary sectional view of the forward end portion of the snubber, illustrating its grooved configuration.

Still referring to FIGS. 13–16, the snubber 54 is slidably mounted in an axial opening through the divider wall 34 and sealingly engages the inner surface of the divider wall 34 defining the opening. The snubber 54 has a generally I-shaped configuration with a forward head or end portion 56 and an opposite rear head or end portion 58. A groove 60, best seen in FIGS. 15 and 16, is formed along the outer radial surface of each end portion 56, 58. This groove 60 replaces and performs the function of the orifice 84 shown and described in the copending application.

The operation of the snubber is illustrated in FIGS. 13 and 14. Referring to FIG. 13, as fluid pressure in chamber 40 moves the cylinder 8 to the right (as shown), the fluid pressure also acts on the forward end portion 56 of the snubber 54 to hold it in the position shown in FIG. 13. As the cylinder 8 moves to the right, the rear end portion 58 of the snubber 54 moves into a recess 62 in the forward end of rear piston head 42. Rear end portion 58 contacts a wire rod 82 to operate one of the check valves 66, as described further below. The initial movement of the end portion 58 into the recess 62 restricts flow of fluid from chamber 46 into rod chamber 33. This has a dampening effect on the movement of the cylinder 8. When the outer radial surface of the end portion 58 contacts the confronting radial end of the piston rod 32, further movement of fluid from chamber 46 to chamber 33 is limited to flow through the groove 60. This provides increased resistance to movement of the cylinder 8 to increase the cushioning or dampening effect. Once the end portion 58 has contacted the piston rod 32, the snubber 54 begins to slide relative to the divider wall 34, as illustrated in FIG. 14. Movement of the cylinder 8 is stopped when the rear radial surface of the divider wall 34 contacts the outer confronting radial surface of the piston head 42. When the cylinder 8 is subsequently moved in the opposite direction, leftward as illustrated in FIGS. 13 and 14, the end-of-stroke movement is dampened in the same manner as the divider wall 34 approaches the forward piston portion 10.

Referring to FIGS. 1–8, the forward (leftward as shown) ball ends 14 of each of the first and second motors 2, 4 and the rear ball ends 14 of each of the second and third motors 4, 6 are each provided with a check valve 66. The valve 66 itself is of the same general type disclosed in my U.S. Pat. No. 4,712,467. An important aspect of the present invention is the manner in which the check valves 66 cooperate with other control elements of the system to provide a more durable, more easily maintained, and more compact drive and control system.

Figure 9:
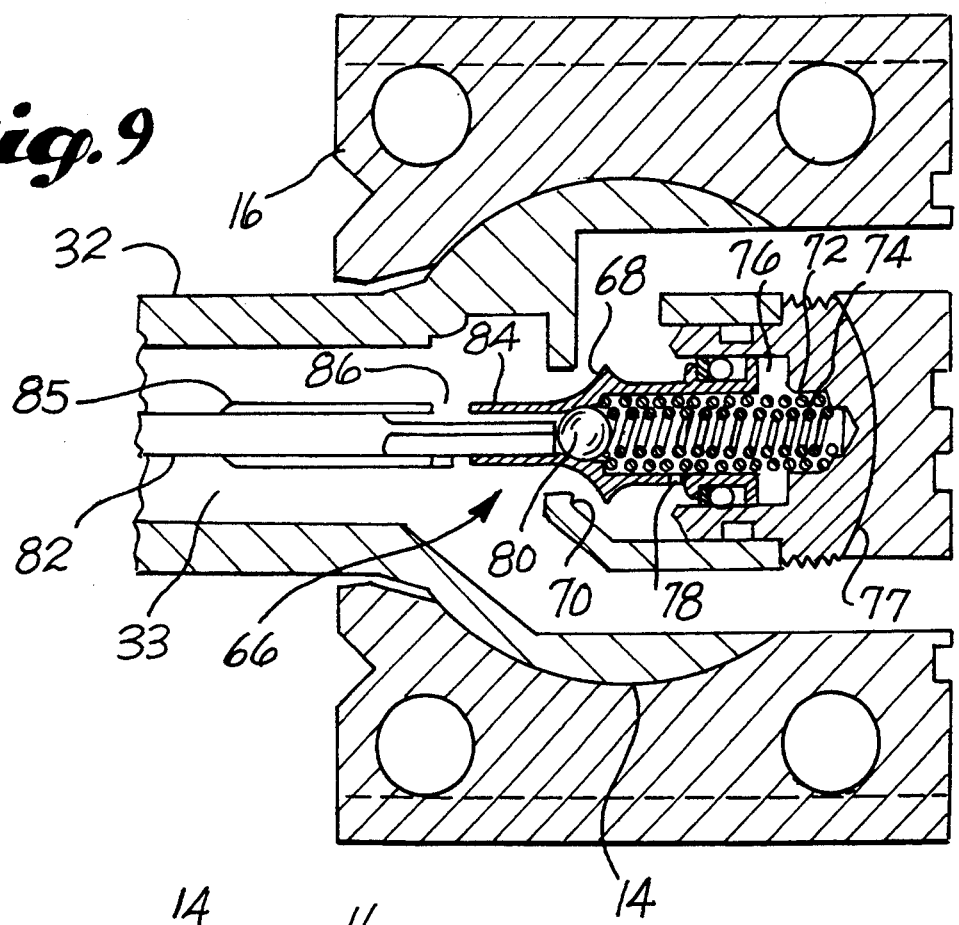
FIG. 9 is a sectional view of one of the motor ends shown in FIGS. 1–8 that includes an internal control valve.
Figure 10:
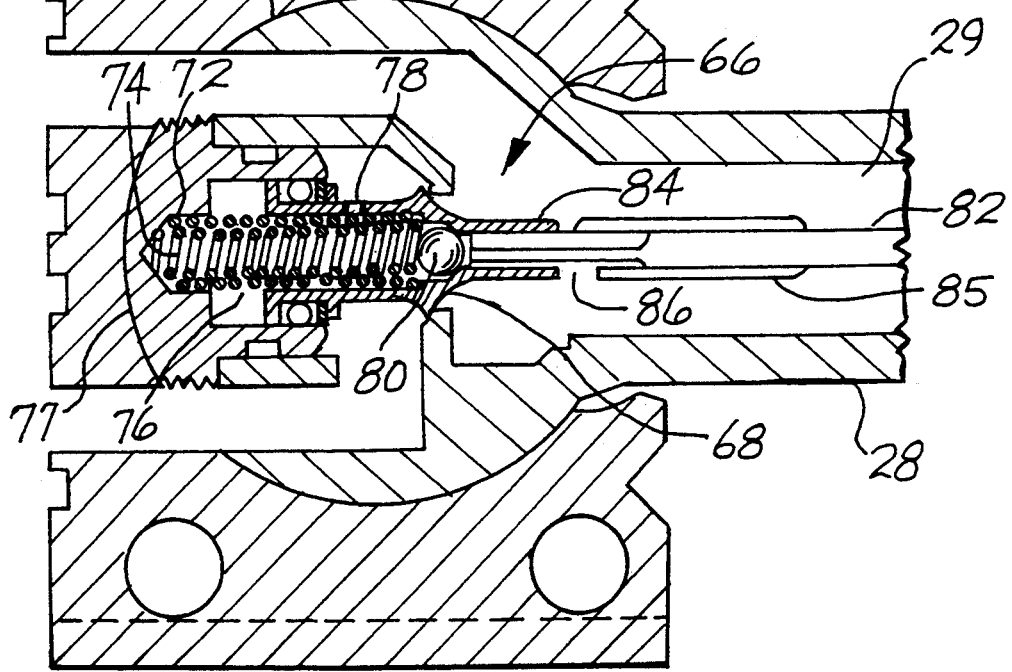
FIG. 10 is like FIG. 9 except that it shows the valve element seated.
Figure 11:
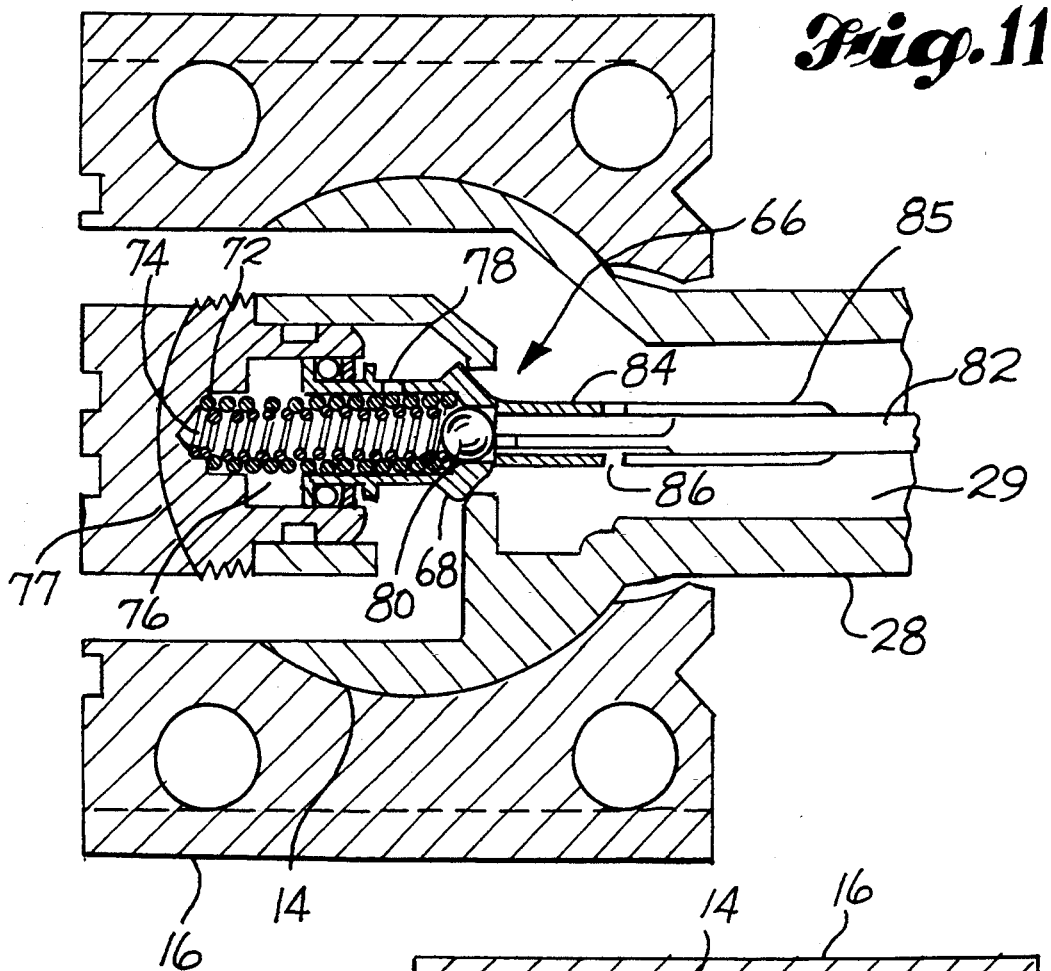
FIG. 11 is like FIG. 10 except that it shows the ball element of the valve unseated by engagement with the wire push rod.
Figure 12:
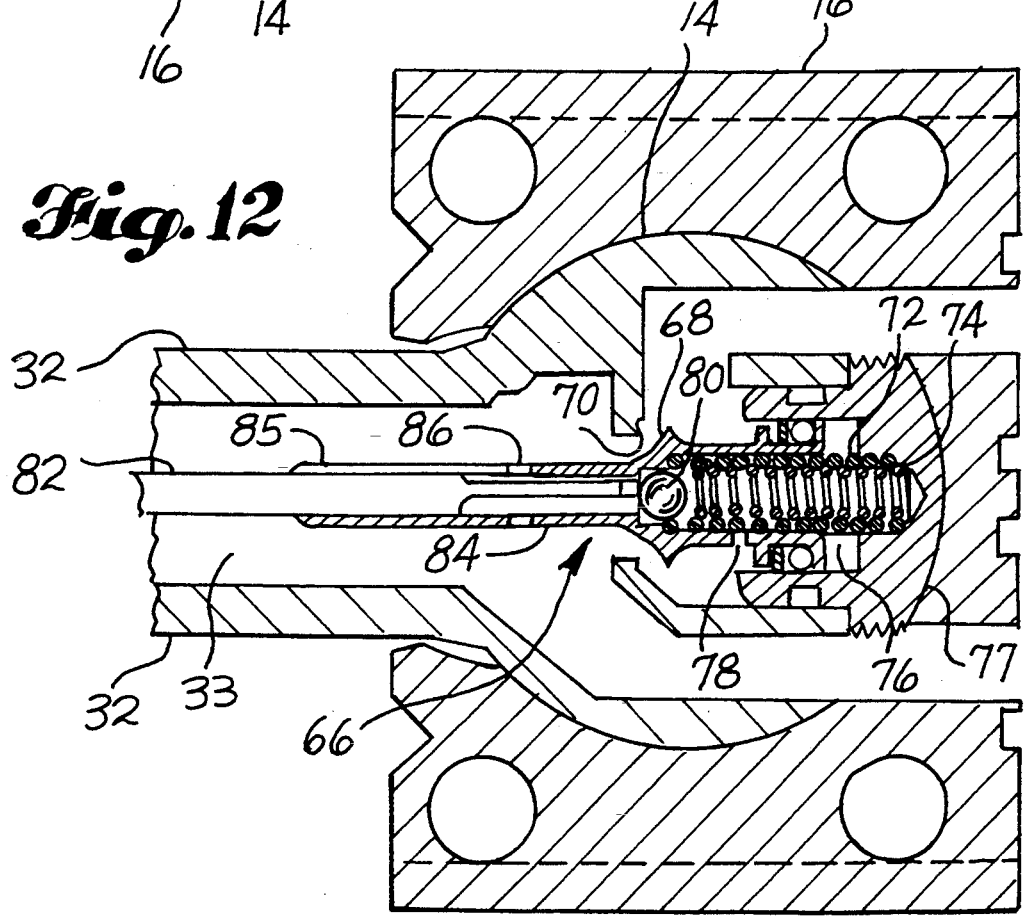
FIG. 12 is like FIG. 11 except that it shows the next stage of the valve operation following engagement by the push rod in which the valve element itself is unseated.

Each of the four check valves or internal control valves 66 has the same structure, which is best seen in FIGS. 9–12. Referring to those figures, each valve 66 has a valve plug 68 that is biased by a pair of springs 72, 74 to seat against valve seat 70. The ball 14 has a plug insert 77 to permit assembly of the valve 66. The insert 77 cooperates with an elongated extension of the valve plug 68 to define a spring chamber 76 in which the springs 72, 74 are positioned. An orifice 78 in the valve plug extension communicates the spring chamber 76 with the chamber surrounding the valve plug 68. The valve plug 68 carries a ball 80 that is biased by spring 74 into seating engagement with an internal radial shoulder formed on an axial passageway through the plug 68. A guide tube 84 through which the passageway extends is provided on the end of the valve plug 68 opposite the spring chamber 76. One end of a wire rod 82, mentioned above, is received into the guide tube 84. The rod 82 carries a stop 85 that limits relative axial sliding movement of the rod 82 relative to the guide tube 84, as illustrated in FIGS. 11 and 12. An opening 86 is formed between the guide tube 84 and the wire rod 82 to provide communication between the spring chamber 76 and the piston rod chamber 29, 33.

In the operation of the valve 66, when the piston rod chamber 29, 33 is connected to return and the wire rod 82 is out of contact with the guide tube 84, both the valve plug 68 itself and the ball 80 carried thereby are seated, as shown in FIG. 10. When pressure is introduced into the rod chamber 29, 33, the pressure acts on the valve plug 68 to unseat it, as shown in FIG. 9. The check valve 66 may also be opened by engagement of the snubber 54 with the end of the wire rod 82 opposite the end which engages the ball 80 and is shown in FIGS. 9–12. This opposite end normally projects outwardly from the end of the piston rod 28, 32, as shown, e.g., in the forward portion of motor 4 in FIG. 2. As illustrated in FIG. 11, the wire push rod 82 engages the ball 80 to unseat the ball 80. This allows hydraulic fluid to escape from the spring chamber 76 through the opening 86 at a rate faster than hydraulic fluid enters the spring chamber 76 through the orifice 78. The result is a lowering of pressure in the spring chamber 76 to a level below the pressure level surrounding the valve plug 68. This pressure differential causes the check valve 66 to push itself open, i.e. the valve plug 68 to unseat, as shown in FIG. 12. The engagement of the end of the guide tube 84 by the wire rod stop 85 assists the pressure differential in unseating the valve plug 68. The unseating of the valve plug 68 is a quick snap movement, as described in the aforementioned U.S. Pat. No. 4,712,467. After the valve plug 68 has been unseated, continued engagement of the guide tube 84 by the stop 85 prevents the valve 66 from fluttering by holding the valve plug 68 in an open position.

Figure 18:
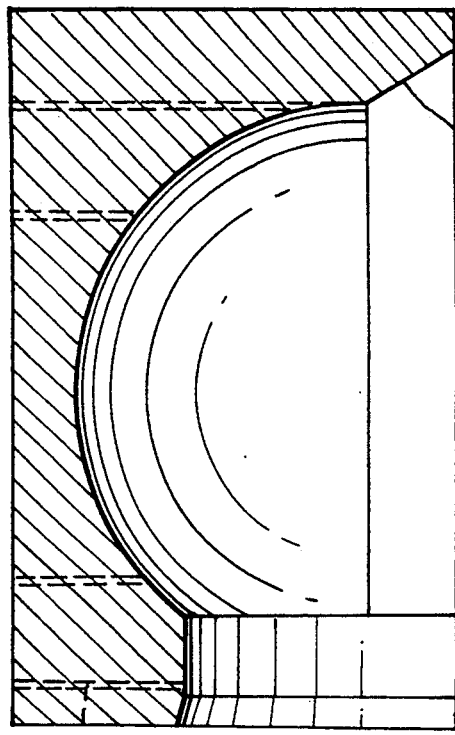
FIGS. 18 and 19 are sectional views of the upper and lower portions, respectively, of the ball block shown in FIG. 17.
Figure 19:
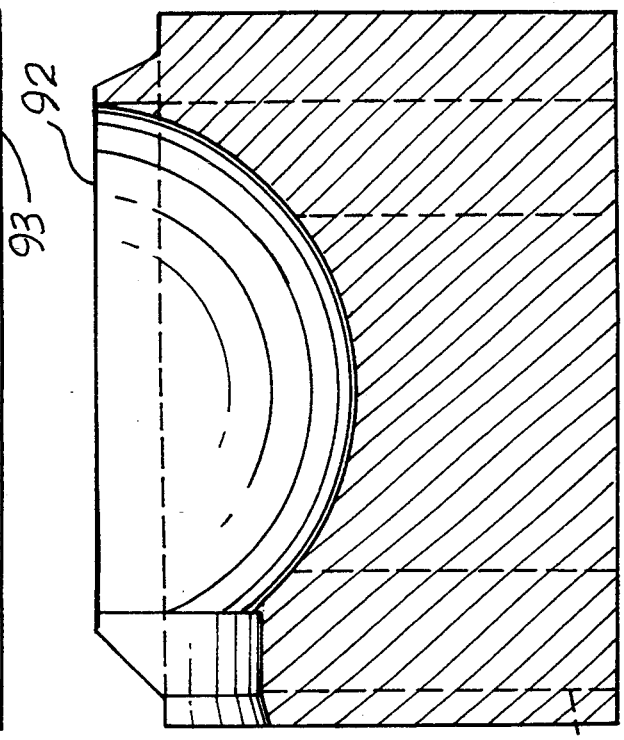
Figure 17:
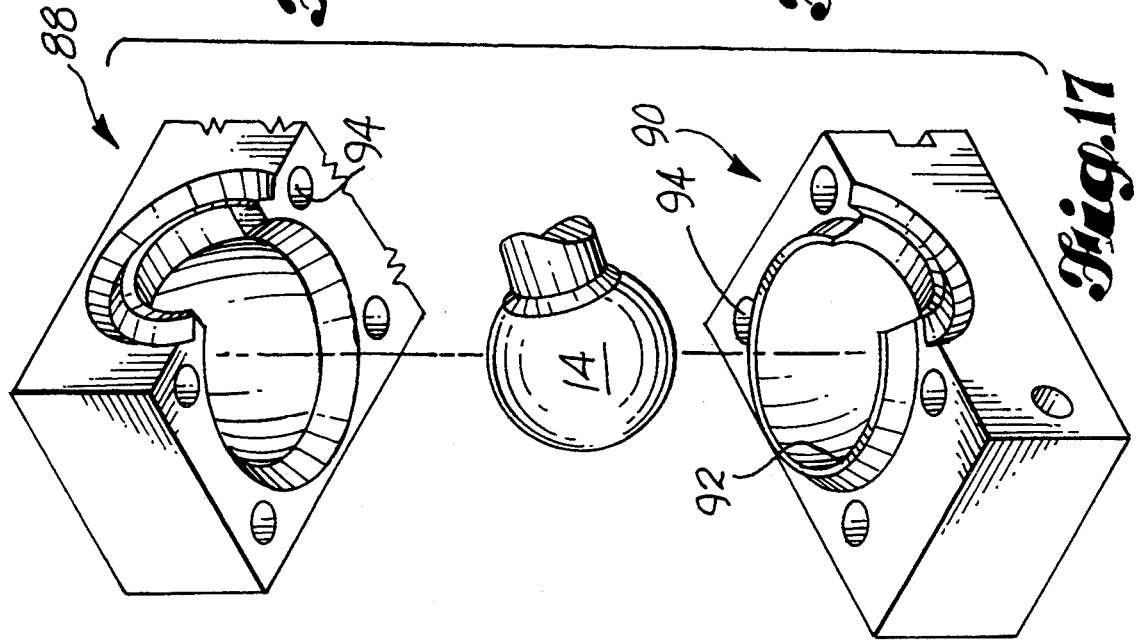
FIG. 17 is an exploded pictorial view illustrating the preferred embodiment of the ball block arrangement for mounting the motor ends.

In a control system constructed according to the invention, the two opposite ends of each motor may be mounted in various ways. Preferably, each motor end has a ball 14 formed thereon which is mounted in a ball block as shown in the drawings and described above. The ball blocks 16 are preferably configured to transmit forces caused by operation of the motors 2, 4, 6 in the manner disclosed in my U.S. patent application Ser. No. 08/054,533, filed Apr. 28, 1993, and entitled "Ball Block for Mounting Linear Motor". The disclosure of that application is incorporated herein by reference. The currently preferred form of the ball block 16 for use in systems incorporating the present invention is shown in FIGS. 17–19. Each ball block 16 has an upper portion 88 and a lower portion 90. The lower portion 90 has a flange 92 formed thereon that is received into a correspondingly configured opening 93 in the upper portion 88. The two halves 88, 90 of the ball block 16 are secured together by means of fasteners received through fastener openings 94 circumferentially spaced around the ball receiving cavity formed by the two portions 88, 90. As described in my copending application, the operating forces of the motors are transmitted to support structure directly through the end wall of the upper ball block portion 88 through which the motor axis extends.

Figure 5:
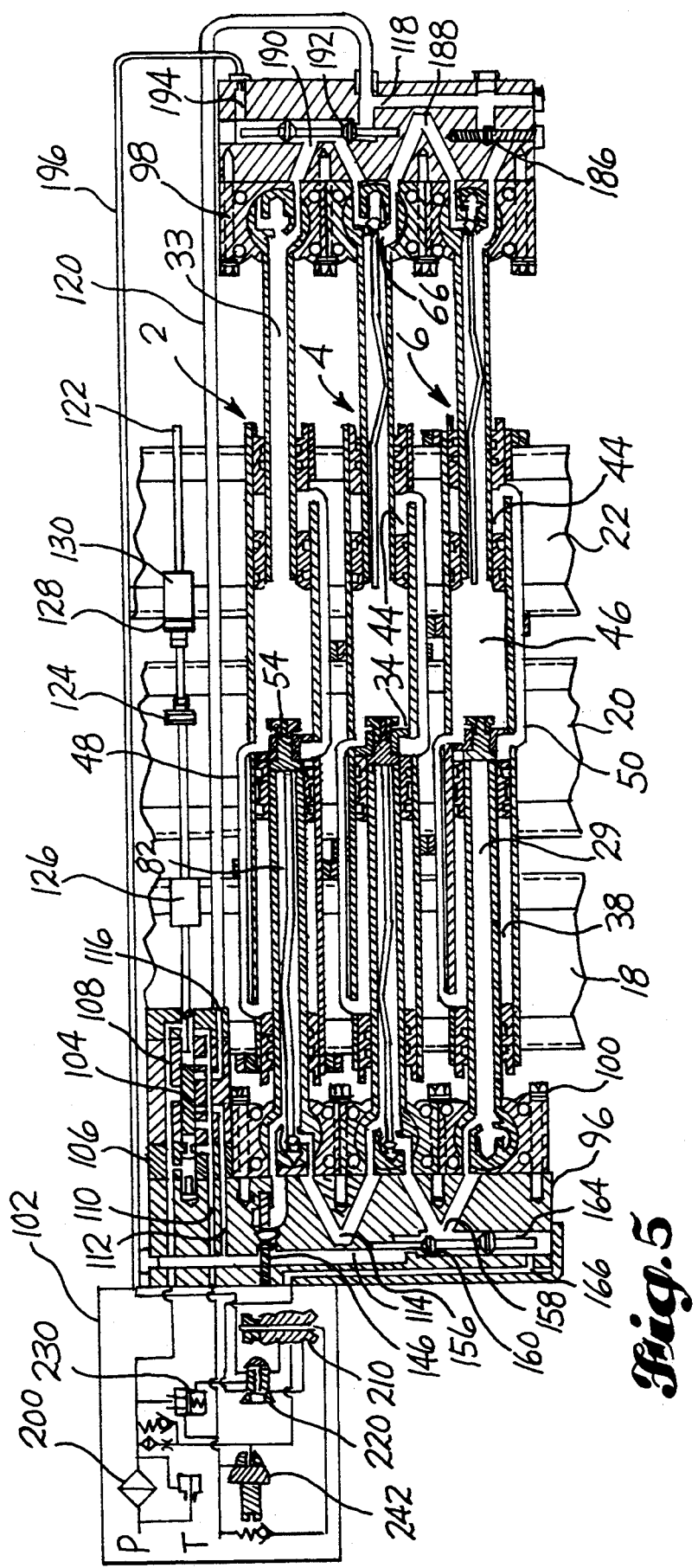
FIGS. 5–8 are similar to FIGS. 1–4 except that they illustrate the unload sequence of the conveyor.

The overall configuration of the control system can best be seen in FIGS. 1 and 5. The configuration is designed to minimize external fluid connections to protect against hydraulic leaks. The system includes a front manifold 96 and a rear manifold 98. Each of these manifolds 96, 98 is secured to its corresponding ball blocks 16 by fasteners 100. An additional manifold or control block 102 is in turn secured to the forward manifold 96. A three-part switching valve body 106 is also secured to the forward manifold 96 opposite the control block 102, as shown in FIGS. 1 and 5. The switching valve body 106 is provided in three parts in order to provide ease of assembly of the switching valve 104.

The structure of the switching valve 104 may vary considerably without departing from the spirit and scope of the present invention. The preferred construction of the valve is disclosed in my U.S. Pat. No. 5,103,866 and is shown in FIGS. 1–8. The disclosure of FIGS. 8 and 10 and the description relating thereto of that patent are incorporated herein by reference. The switching valve 104 has a plurality of ports and is connected to a source of hydraulic pressure P by a pressure line 108 that extends from the control block 102 through the forward manifold 96 to the valve body 106. The valve 104 is also in communication with return or tank T by a return line 110 that extends from the control block 102 through the forward manifold 96 to the valve body 106. A forward control line 112 extends from the switching valve 104 to a forward control passageway 114 in the front manifold 96. A rear control line 116 extends from the valve 104 through the valve body 106 and is connected to a rear control passageway 118 in the rear manifold 98. The control line 116 is connected to the passageway 118 by a conduit 120 that extends from the valve body 106 to the rear manifold 98 parallel and laterally adjacent to the motors 2, 4, 6, as best shown in FIGS. 1 and 5.

The switching valve 104 selectively connects the control lines 112, 116 to pressure and return. The valve 104 has two positions and is moved between these two positions by means of a control rod 122. The rod 122 carries a forward abutment 124 and a rear abutment 128. The forward abutment 124 is engaged by an abutment 126 carried by the transverse drive member 18 for the first motor 2 to move the control rod 122 and thereby move the valve spool to the right (as shown) as the first motor 2 reaches its end-of-stroke movement in the rearward direction. The rear abutment 128 is engaged by an abutment 130 carried by the transverse drive member 22 for the third motor 6 as the third motor 6 reaches its forward end-of-stroke movement.

Figure 3:
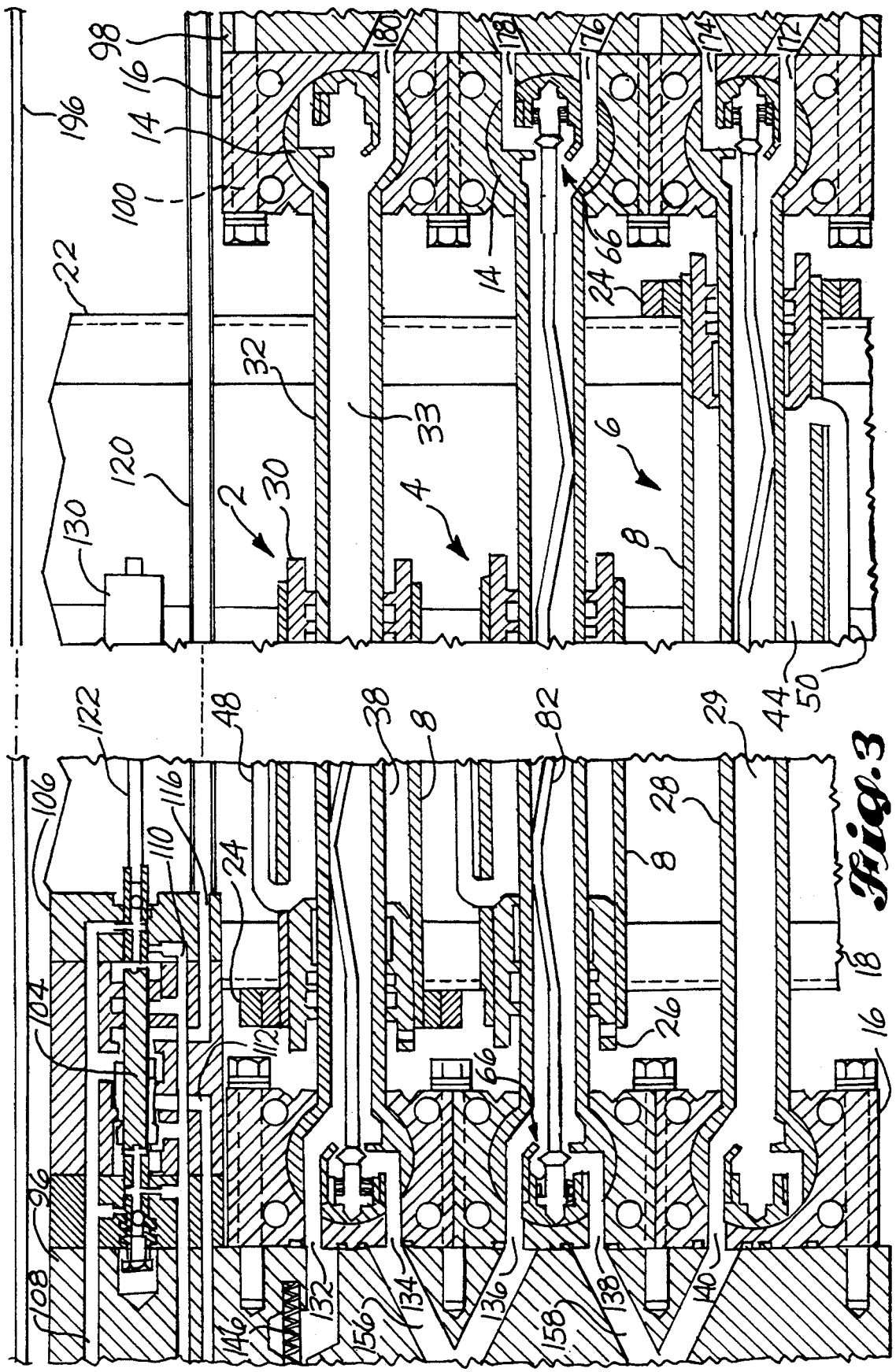
FIG. 3 is a further enlarged sectional view of the center portion of the system shown in FIGS. 1 and 2, illustrating the subsequent step in which the second motor has also been moved forwardly.
Figure 4:
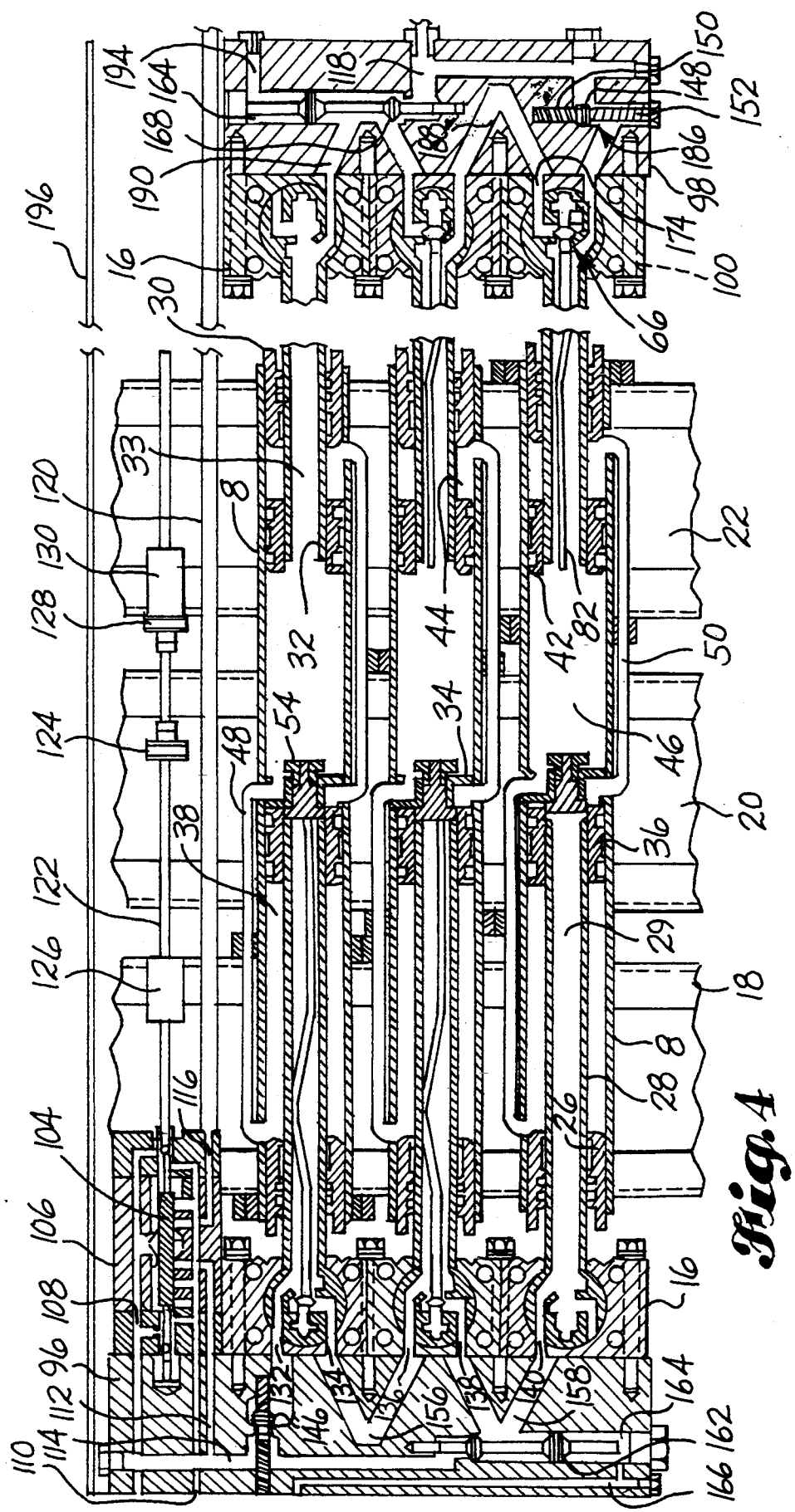
FIG. 4 is like FIG. 1 except that the control block has been omitted and the system is illustrated following the next step in which the third motor has been moved forwardly.

Referring to FIGS. 1, 4, 5, and 8, the forward control line 112 from the switching valve 104 communicates the forward motor ends and an unload control valve 160 with pressure or return, depending on the position of the switching valve 104. Referring to FIGS. 3 and 4, the control line 112 communicates with the forward ball end 14 of the first motor 2 through a port 132. The ball end 14 has a second port 134, with communication between the two ports 132, 134 being controlled by the check valve 66 in the ball end 14. A V-shaped passageway 156 extends through the manifold 96 from the second port 134 of the first motor 2 to a first port 136 of the forward ball end 14 of the second motor 4. Communication between the port 136 and a second port 138 is controlled by another check valve 66. A second V-shaped passageway 158 extends from the port 138 to a single port 140 in the forward end of the third motor 6. The passageway 158 is also directly connected to the forward control passageway 114 by means of a branch of the passageway 114 controlled by the unload control valve 160, described further below.

An unload restrictor valve 146 is positioned between the control passageway 114 and the first port 132 of the first motor 2. A corresponding load restrictor valve 186 is located in the rear manifold 98. The structure of the two restrictor valves 146, 186 is identical in all significant aspects. Referring to the right hand portion of FIG. 4, the rear restrictor valve 186, and thus the forward restrictor valve 146, includes a valve element 148 that has two rods extending axially therefrom in opposite directions. A heavy spring 150 is positioned around one of the rods, and a light spring 152 is positioned around the other. The heavy spring 150 restricts movement of hydraulic fluid past the restrictor valve 146 when the valve element 148 is exposed to return. The relatively light weight of the other spring 152 allows flow of fluid past the valve element 148 essentially without restriction when the element 148 is exposed to hydraulic pressure. This one-way restriction has the purpose described below.

Referring to FIGS. 1, 4, 5, and 8, the unload control valve 160 has an elongated valve stem with a piston 162 formed thereon. A valve element or plug 168 is also carried by the stem and is spaced from the piston 162 longitudinally along the stem. The valve 160 reciprocates in a passageway formed in the front manifold 96 between a position in which the valve element 168 is seated against a valve seat formed by the manifold body, as shown in FIG. 4, and an unseated position, shown in FIG. 8. The portion of the passageway between the piston 162 and the valve element 168 may be regarded as a pressure chamber. The piston 162 separates this pressure chamber from a pilot chamber 164. The piston 162 and the valve element 168 have confronting pressure surfaces with differential pressure surface areas so that, when the pilot chamber 164 is connected to pressure, the valve element 168 is seated, and when the pilot chamber is connected to return, the valve element 168 remains unseated. In the former case, the pressure in the pilot chamber 164 acts on the piston 162 to move the valve 160 into its seated position and hold it there. When the pilot chamber 164 is connected to return, the valve element 168 is allowed to unseat and remain unseated. The pilot chamber 164 is selectively connected to pressure or return by control elements in the control block 102 via a pilot passageway 166.

Still referring to FIGS. 1, 4, 5, and 8, the porting of the rear ends of the motors 2, 4, 6 and the control elements associated therewith are substantially the same as those of the front ends of the motors 2, 4, 6. The major difference is that the control configuration of the first and third motors 2, 6 is reversed. The third motor 6 has first and second ports 172, 174 (FIG. 3), with the second port 174 communicating with a first port 176 of the second motor via a V-shaped passageway 188. A second port 178 of the second motor 4 communicates with the single port 180 of the first motor 2 via a V-shaped passageway 190. The load restrictor valve 186 referred to above is positioned between the rear control passageway 118 and the first port 172 of the third motor 6. A load control valve 192 having the same structure as the unload control valve 160 described above controls communication between the second V-shaped passageway 190 and the control passageway 118. A pilot passageway 194 communicates with the pilot chamber 164 of the valve 192 and with the control block 102 via a conduit 196 that is adjacent and parallel to the switching valve control rod 122 and parallel to the first conduit 120 and the motors 2, 4, 6.

Figure 20:
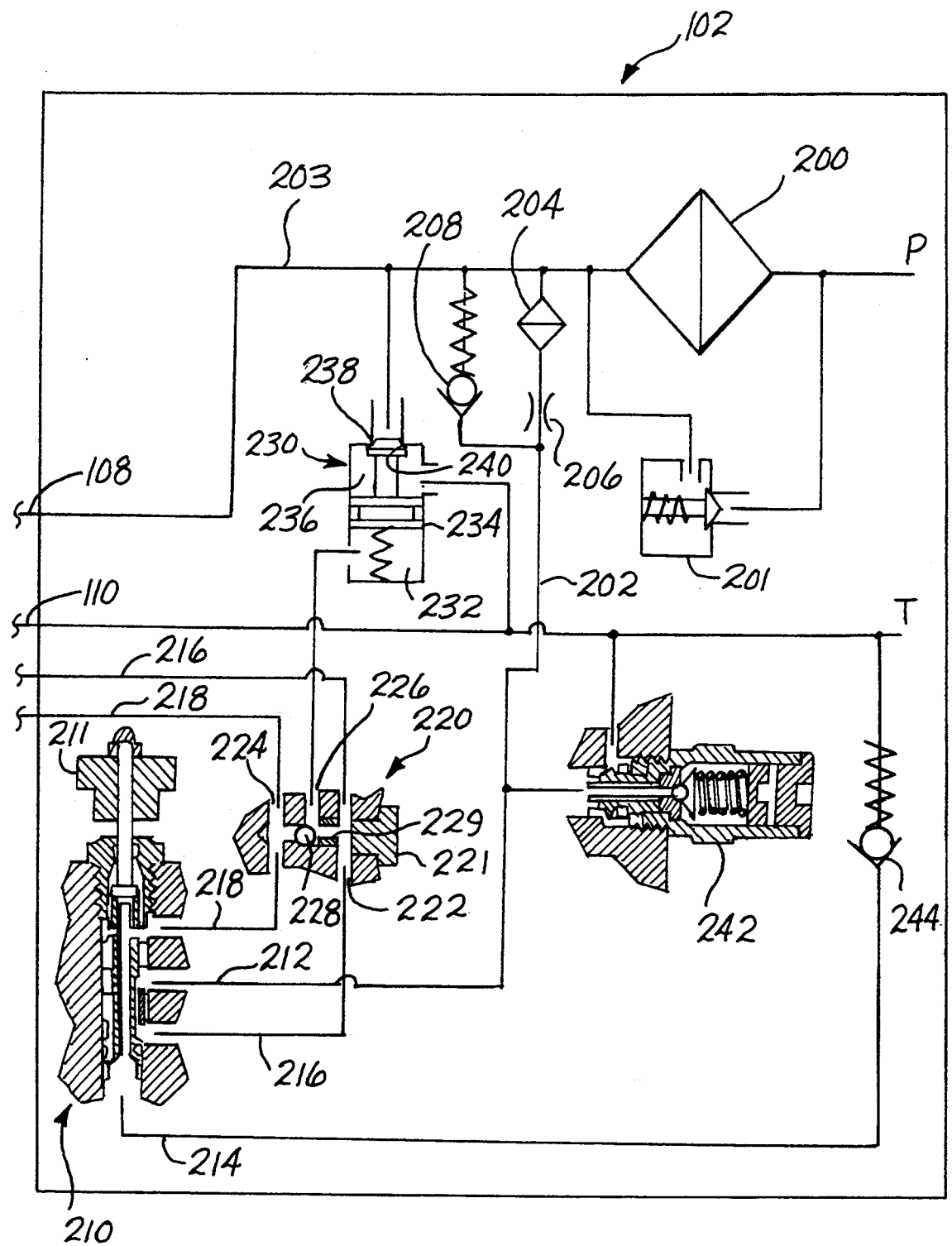
FIGS. 20–22 are enlarged diagrams of the control block portion of the control system of the preferred embodiment, illustrating the configuration of the control block elements in the unload sequence, load sequence, and the off condition, respectively.
Figure 21:
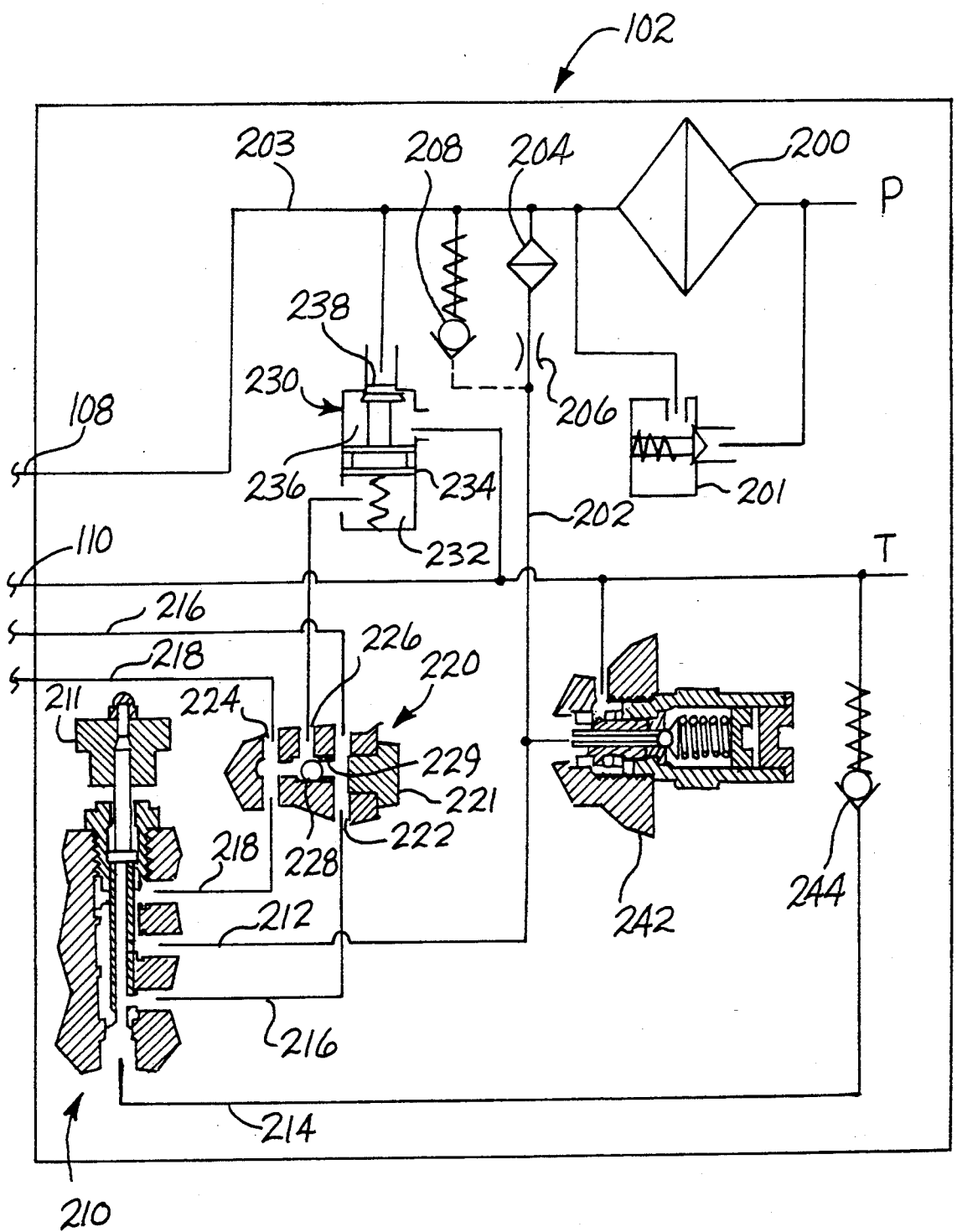
Figure 22:
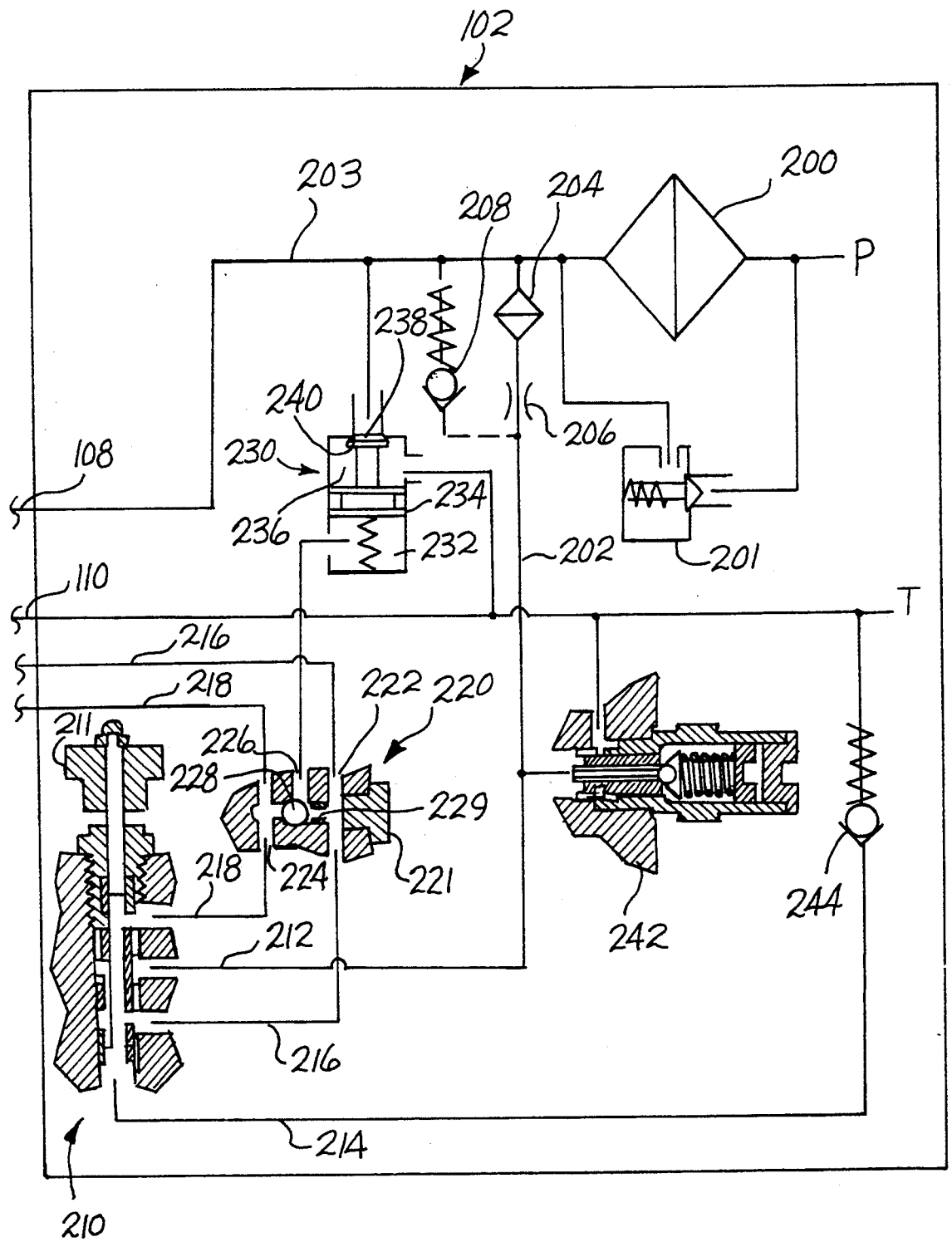

The components included in the control block 102 can best be seen in FIGS. 20–22. The control system shown in the drawings is connected to a source of hydraulic pressure and to tank or return through the control block 102. The control block has a pressure inlet port P for connecting to the source of hydraulic pressure and an outlet port T for connecting to tank or return. The pressure line from inlet port P includes a filter 200. A filter bypass valve 201 is provided in parallel with the filter 200 to bypass the filter 200 if the filter 200 should become clogged or otherwise inoperable. Downstream of the filter 200, the pressure line from port P branches into two pressure lines 202, 203. The second of these branches 203 connects with the pressure line 108 for the switching valve 104, described above, to provide hydraulic pressure to the switching valve 104. The other branch 202 has a secondary filter 204 and an associated restrictor 206. A one-way check valve 208 connects the two branches 202, 203 bypassing the secondary filter 204 and restrictor 206. The first branch 202 extends to a pressure port 212 of a four-way, three-position valve 210. The line from the return port T also has two branches, one of which is directly connected to the switching valve return line 110, and the other of which is connected to a return port 214 of the four-way valve 210. The line between the port T and the port 214 has a one-way check valve 244 positioned therein to prevent flow of pressure from the port T to the valve port 214.

The four-way valve 210 is an important element of the combination of the present invention. In addition to the pressure and return ports 212, 214 mentioned above, the valve 210 has a pilot unload port 216 and a pilot load port 218. Lines from these two ports 216, 218 are connected to the forward pilot passageway 166 and the rear pilot passageway 194, respectively. As described above, the latter connection is made via conduit 196. The valve 210 has three positions, which are shown in FIGS. 20–22. FIG. 20 shows the unload position of the valve 210 in which ports 212, 216 are in communication with each other to connect the forward pilot passageway 166 to pressure. Pilot passageway 194 is connected to return by communication of ports 214, 218. FIG. 21 shows the load position of the valve 210 in which port 212 communicates with port 218 and port 214 communicates with port 216 to reverse the pressure and return in the pilot passageways so that pilot passageway 166 is connected to return and pilot passageway 194 is connected to pressure. The off position of the valve 210 shown in FIG. 22 serves as an off position for the conveyor. The unload and load positions shown in FIGS. 20 and 21 correspond to the two modes of operation of the conveyor in which a load is conveyed in a rearward and a forward direction, respectively.

The valve 210 is of a type commonly known as a motor spool valve. More specifically, the currently preferred valve for use in the system is the Vickers (trademark) valve sold under the Model No. 94C23-0110 MRV. Another suitable valve is the one sold by Compact Controls, Inc. under the Model No. CP640-1-B-0-5-3-D. Operation of the valve to move it between its positions is preferably either manual or powered, such as by a solenoid. In either case, the rotatable valve spool is rotated by engaging a head 211 connected to the valve spool to thereby rotate the spool.

A shuttle valve 220 is built into the control block 102 and is positioned between the four-way valve 210 and the pilot passageways 166, 194. The body of the shuttle valve 220 is formed by the control block body and a hex cap plug 221. The control block 102 includes fluid lines extending from the valve ports 216, 218 and through the shuttle valve 220 and then out of the control block 102 to the respective pilot passageways 166, 194. The shuttle valve 220 has an unload path 222 extending therethrough from port 216 and a load path 224 extending therethrough from port 218. A center passageway interconnects the two flow paths 222, 224. Selective communication between the two paths 222, 224 and a shuttle valve outlet port 226 positioned therebetween is controlled by a ball 228 positioned in the center passageway. The ball 228 is freely movable between the position shown in FIGS. 20 and 22 and the position shown in FIG. 21. In the first position, the ball 228 is seated against a shoulder formed by the shuttle valve body. In the second position, the ball seats against an insert 229 that provides a shoulder for seating of the ball 228 and is removable to permit assembly and disassembly of the ball 228 from the valve body. In the first position, the ball 228 blocks communication between path 224 and port 226 and opens communication between path 222 and port 226. In the second position, this is reversed with the port 226 communicating with path 224 and blocked from communication with path 222. The shuttle valve 220 controls operation of an on-off, relief or bypass valve 230, described below.

The relief valve 230 is of the same type as the pilot valve 46 disclosed in my U.S. patent application Ser. No. 08/165,638, filed Dec. 8, 1993, and entitled "Protective Circuit For Pressure and Return". The disclosure of that application relating to such valve is incorporated herein by reference.

Referring to FIGS. 20–22, the valve 230 has a pressure chamber 232 and a bypass chamber 236 separated by a piston 234. A conduit through the control block 102 communicates the shuttle valve port 226 with a port opening onto the pressure chamber 232. A port in the bypass chamber 236 is in direct communication with the return line that extends from the return port T to the return line 110 from the switching valve 104. A valve plug 238 connected to the piston 234 by a reduced diameter portion closes an opening in the bypass chamber 236 communicating with the pressure line 203. The valve plug 238 is normally in seating and sealing engagement with a seat 240 formed by the relief valve body to cut off communication between the pressure line 203 and the bypass chamber 236, as shown in FIGS. 20–22. This seating engagement is maintained by the spring and pressure in the pressure chamber 232. The pressure acts on the larger piston face confronting the pressure chamber 232. The shuttle valve ensures that the chamber 232 is connected to pressure regardless of which of the two ports 216, 218 is connected to pressure. When port 216 is connected to pressure, the ball 228 of the shuttle valve 220 is moved into the position shown in FIG. 20 to also communicate the pressure chamber 232 of relief valve 230 to pressure. Communication of port 218 with pressure moves the shuttle valve ball 228 into the position shown in FIG. 21 to again connect pressure chamber 232 to pressure. Thus, during all stages of normal operation of the system, the valve plug 238 of the relief valve 230 remains in a seated position.

The control block 102 may also include one or more additional elements of a conventional nature. Preferably, it includes a relief valve 242 of a known type. The function of the valve 242 is to protect the system against excessive pressure by providing a pathway through the valve 242 from the pressure port P to the return port T to relieve pressure when pressure at port P exceeds a predetermined level. The example of a suitable valve shown in the drawings is the Vickers (trademark) valve Model No. RV2-10-I-0-40. Another example is the Vickers valve Model No. RV6-10-C-0-50/40. The latter is currently preferred because it lacks the tendency of the illustrated valve to float backwards and allow flow from the line connecting port T to line 110, through the valve 242, and into line 212.

The normal operation of the system to operate a conveyor and thereby convey a load is illustrated in FIGS. 1–8. FIGS. 1–4 illustrate the unload sequence in which a load is conveyed to the rear (to the right as shown). FIGS. 5–8 illustrate the load sequence in which a load is conveyed in the forward direction. As used herein, the terms "rear" and "forward" and the like are used to indicate the conveying directions when a load is being unloaded out of or loaded into a trailer. They are used for the purposes of illustration and are not intended to limit the invention to use in a conveyor installed in a trailer. It, of course, is intended to be understood that the apparatus of the invention may be used to advantage in connection with conveyors in various types of installations, only one of which is a trailer.

Referring to FIG. 1, at the beginning of the unload sequence, the cylinder 8 of each motor 2, 4, 6 is in the rearward position shown. In this position, the abutment 126 carried by the transverse drive beam 18 for the first motor 2 has engaged the abutment 124 on the control rod 122 of the switching valve 104 and has thereby moved the spool of the switching valve 104 to its rearwardmost position shown in FIG. 1. The four-way valve 210 is in the position shown in FIG. 20, in which pressure port 212 is in communication with port 216. The four-way valve 210 is maintained in this position throughout the unload sequence to maintain the unload control valve 160 in the closed position shown in FIGS. 1 and 4 throughout the sequence. Pressure entering the control block 102 through pressure port P flows through pressure line 202 to port 212 of the four-way valve 210, through valve 210 and out valve port 216, through shuttle valve path 222, and to the pilot passageway 166 and pilot chamber 164 in the forward manifold 166. The pressure in pilot chamber 164 acts on piston 162 of the unload control valve 160 to maintain the valve element 168 in its seated position.

At the same time, pressure from pressure port P flows through pressure lines 203 and 108 through the control block 102 and the switching valve body 106 to the switching valve 104. In the position of the switching valve 104 illustrated in FIG. 1, the pressure in line 108 is communicated to the rear control passageway 118 in the rear manifold 98 through conduit 120. The forward control passageway 114 in the forward manifold 96 is connected by the switching valve 104 to return. The pilot chamber 164 in the rear manifold 98 for the load control valve 192 is connected to return through pilot passageway 194, conduit 196, shuttle valve path 224, and ports 218, 214 of four-way valve 210.

Still referring to FIG. 1, at the rear ends of motors 2, 4, 6, the valve plugs 68 of check valves 66 in motors 4, 6 are both unseated because of engagement of the valve control rods 82 by the corresponding snubbers 54. Pressure flowing into the control passageway 118 of rear manifold 98 unseats the load control valve 192 and flows freely past valve element 168 into V-shaped passageway 190 to port 180 of the first motor 2 and through the port 180 into the piston rod chamber 33 of the first motor 2. Pressure is also supplied to the piston rod chambers 33 of the second and third motors 4, 6.

Pressure enters the second motor 4 from V-shaped passageway 190 through port 178 and past the open check valve 66. It also enters port 176 via V-shaped passageway 188 and the third motor 6. Pressure is supplied to the third motor 6 through rear control passageway 118, past load restrictor valve 186 and through port 172. The pressure in the rear end of the third motor 6 also exits the third motor 6 past its open check valve 66 and out its port 174 into V-shaped passageway 188 to the second motor 4. In each of the three motors 2, 4, 6, pressure in the piston rod chamber 33 is communicated to the forward annular chamber 38 via the forward conduit 48.

In each motor 2, 4, 6, pressure in chamber 33 acts on the divider wall 34, and pressure in the annular chamber 38 acts on the forward cylinder head 26 to tend to move the motor cylinder 8 in a forward direction. However, only the cylinder 8 of the first motor 2 moves forwardly since the other two motors are hydraulically blocked. The rod chamber 29 and main chamber 40 of the forward portion of the first motor 2, and the annular chamber 44 of the rear portion of the motor 2, are connected to return via port 132 of the motor 2 and forward control passageway 114. This permits the pressure supplied to the rear end of the motor 2 to move the cylinder 8 in a forward direction. The cylinders 8 of the second and third motors 4, 6 do not move because the corresponding chambers 29, 40, 44 of the two motors 4, 6 are blocked from return by the closed unload control valve 160 and the closed forward check valves 66.

Figure 2:
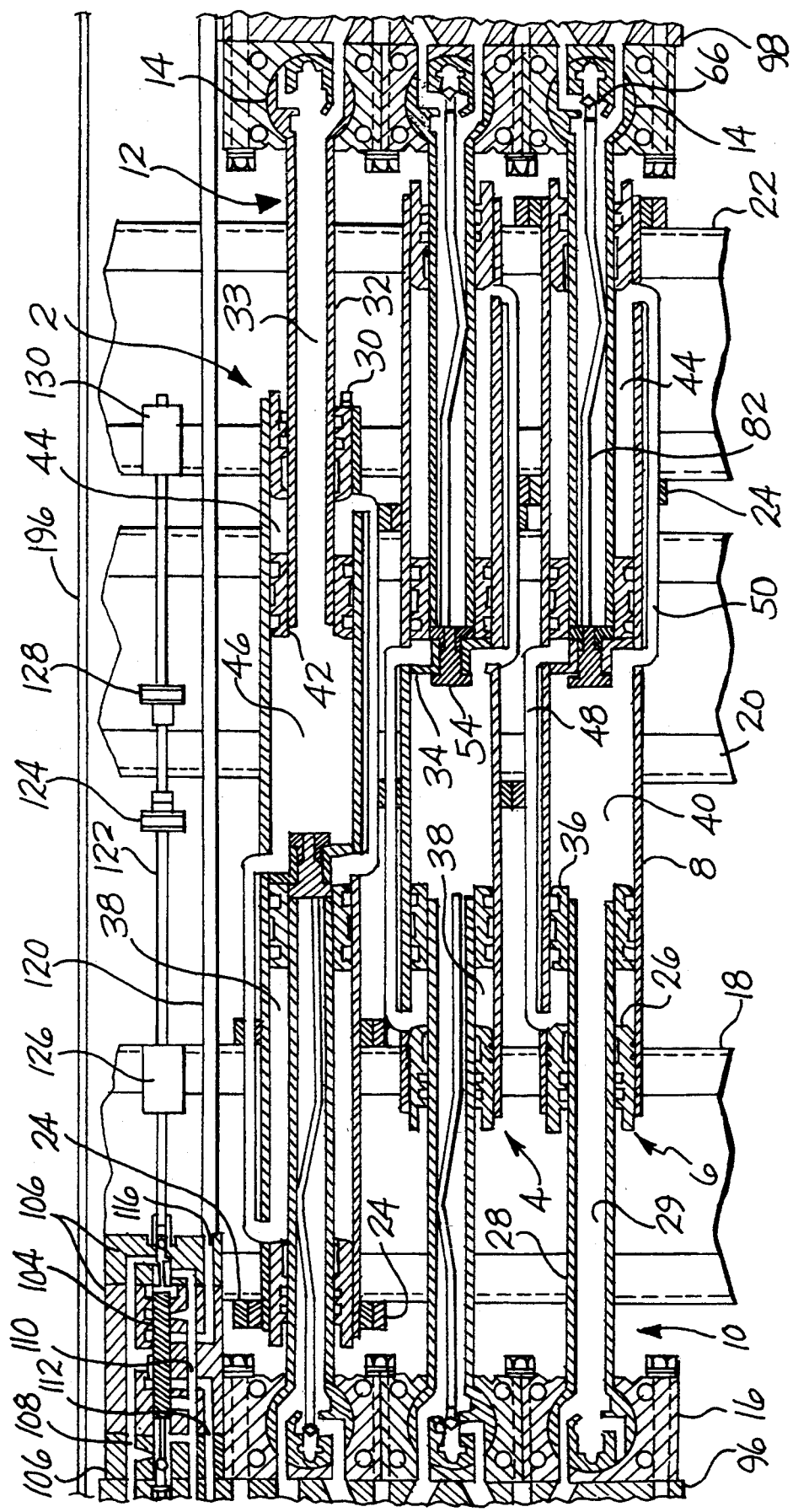
FIG. 2 is an enlarged sectional view of the center portions of the apparatus shown in FIG. 1, illustrating the next step in the unload sequence in which the first motor has been moved forwardly.

FIG. 2 shows the next stage of the unload sequence following the movement of the first motor cylinder 8 to its forwardmost position shown in FIG. 2. The check valve 66 in the forward end of the first motor 2 has been opened by contact between the valve control rod 82 and the snubber 54 at the end of the forward stroke of the motor 2. Therefore, port 136 of the second motor 4 is in communication with return via V-shaped passageway 156, port 134 of the first motor 2, and the opened check valve 66. This permits the cylinder 8 of the second motor 4 to move forwardly.

FIG. 3 illustrates the next stage of the unload sequence in which the forward check valve 66 in the second motor 4 has been opened by the forward end of stroke movement of the cylinder 8 of the second motor 4. The opened check valve 66 communicates the port 140 in the third motor 6 to return via port 138 in the second motor 4. This allows the cylinder 8 of the third motor 6 to move forwardly. As the cylinder 8 nears the end of its forward stroke, the abutment 130 carried by the third transverse drive beam 22 engages the abutment 128 on the switching valve control rod 122. The engagement shifts the spool of the switching valve 104 into its second position in which forward control passageway 114 is connected to pressure and rear control passageway 118 is connected to return.

Once the cylinders 8 of all three motors 2, 4, 6 have moved sequentially to their forward positions, as described above, the three cylinders 8 are simultaneously moved rearwardly to convey the load rearwardly. FIG. 4 illustrates the configuration of the system at the beginning of this simultaneous movement. The shifting of the switching valve 104 at the end of the forward stroke of the third motor 6 has caused pressure to be supplied to the forward ends of each of the three motors 2, 4, 6 via forward control passageway 114. Pressure in the passageway 114 moves past unload restrictor valve 146 into port 132 of the first motor 2, past the open check valve 66, out port 134 and through V-shaped passageway 156 into the second motor 4 through its port 136. The pressure in the second motor 4 flows past the open check valve 66 and out port 138, through V-shaped passageway 158 and into the third motor 6 through its port 140.

At the rear end of the motors 2, 4, 6, the internal check valves 66 of the second and third motors 4, 6 have been closed by the valve springs 72, 74. Load control valve 192 remains open since the pilot chamber 164 thereof remains connected to return and return pressure in V-shaped passageway 190 and the pressure area difference between the piston 162 and the valve element 168 prevent it from closing. The rear end of each of the three motors 2, 4, 6 is connected to return via rear control passageway 118, conduit 120, switching valve 104, and return line 110. The rear end of the first motor 2 is connected to the control passageway 118 through port 180 and V-shaped passageway 190 and past the valve element 168 of the load control valve 192. The rear end of the third motor 6 is connected to the passageway 118 through port 172 and past load restrictor valve 186. When the cylinders 8 begin to move, return pressure in the rear end of the second motor 4 causes the internal check valve 66 of the second motor 4 to crack open sufficiently to allow escape of hydraulic fluid from the rear rod chamber 33 into V-shaped passageway 190, which is connected to return as described above. Pressure in the forward ends of the first and second motors 2, 4 maintains the forward check valves 66 in an open position.

The pressure in the forward ends of the motors 2, 4, 6 causes the cylinders 8 to move simultaneously to the rear. As the motors 2, 4, 6 move rearwardly, escape of fluid from the rod chamber 33 of the third motor 6 is restricted by the load restrictor valve 186. The valve element 148 of the valve 186 is biased by the heavy spring 150 to restrict flow past the valve element 148. This restriction of flow from the third motor 6 ensures that the third motor 6 does not move faster than the other two motors 2, 4. During the end of stroke portion of the simultaneous movement, the abutment 126 carried by the first transverse drive beam 18 engages the switching valve control rod abutment 124 to return the switching valve 104 to its first position shown in FIGS. 1-3. At the end of the rearward stroke, the snubbers 54 of the second and third motors 4, 6 open the rear internal check valves 66 so that the system returns to the configuration shown in FIG. 1 and the unload sequence is repeated to move the cylinders 8 sequentially forwardly and then simultaneously rearwardly until the desired conveying of the load has been completed.

Figure 8:
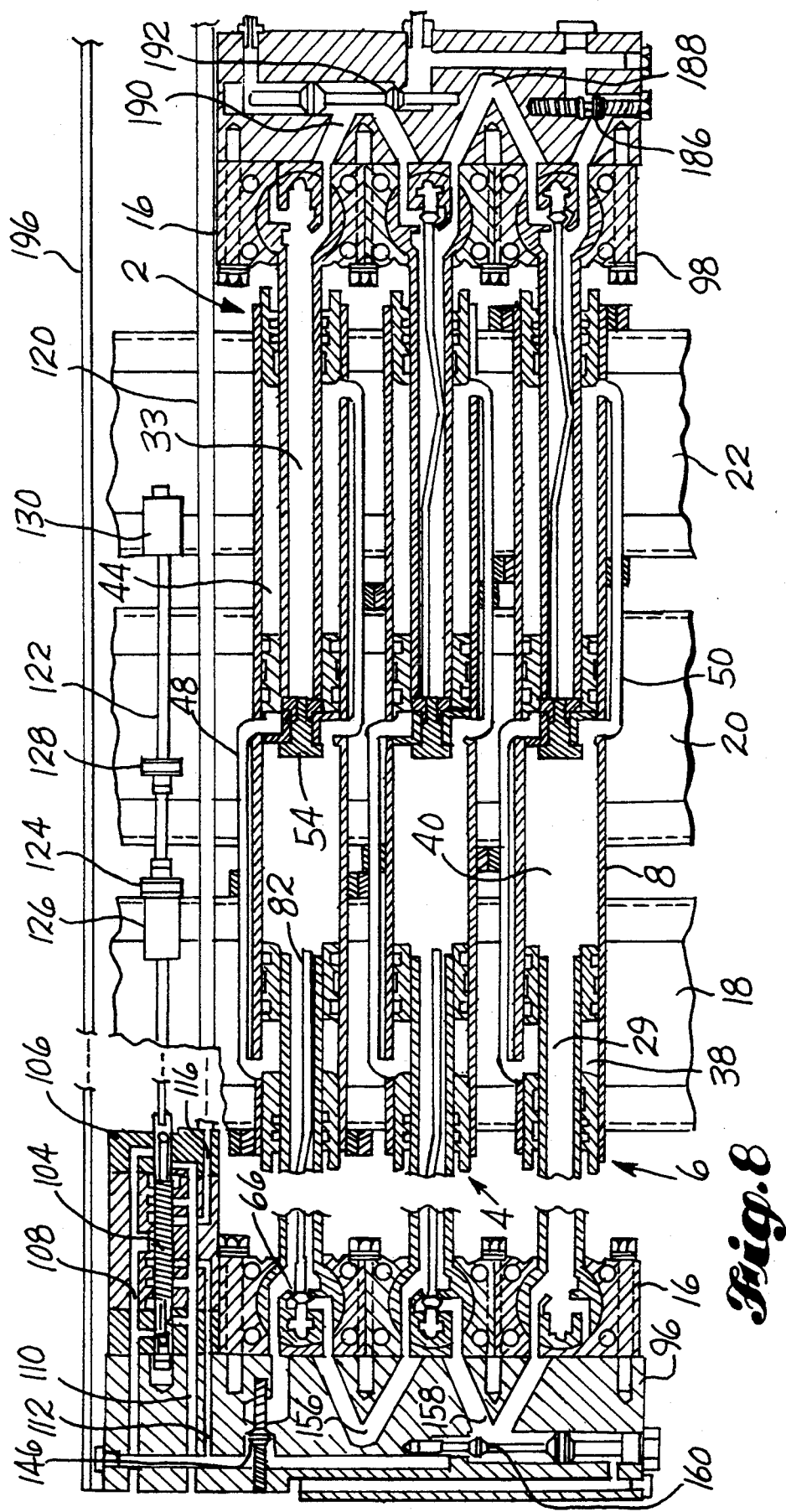

The unload sequence is the reverse of the load sequence. The reversal of the sequence is accomplished by moving the four-way valve 210 to the position shown in FIG. 21. The valve 210 is maintained in this position throughout the load operation to connect the pilot chamber 164 of the unload control valve 160 to return and the pilot chamber 164 of the load control valve 192 to pressure. This maintains the load control valve 192 in the closed position shown in FIGS. 5 and 8, and permits the unload control valve 160 to remain open, as shown in FIGS. 5 and 8, throughout the loading operation. The switching valve 104 remains in the position shown in FIGS. 4 and 5 during the first stage of the load sequence.

At the beginning of the load sequence, all of the motor cylinders 8 are in their forward positions shown in FIGS. 4 and 5. Referring to FIG. 5, pressure is supplied to the forward end of each of the motors 2, 4, 6 through the switching valve 104. The pressure flow pattern is the same as in FIG. 4 except that pressure is supplied to the third motor 6 past the open unload control valve 160 as well as through the first and second motors 2, 4. The rear end of the third motor 6 is connected to return through its port 172, past load restrictor valve 186, and through rear control passageway 118, conduit 120, and switching valve 104. The rear ends of the first and second motors 2, 4 are blocked from communication with return by the closed load control valve 192 and the closed internal check valves 66 in the second and third motors 4, 6. Therefore, the cylinder 8 of the third motor 6 moves rearwardly while the cylinders 8 of the other two motors 2, 4 remain in their forward position.

Figure 6:
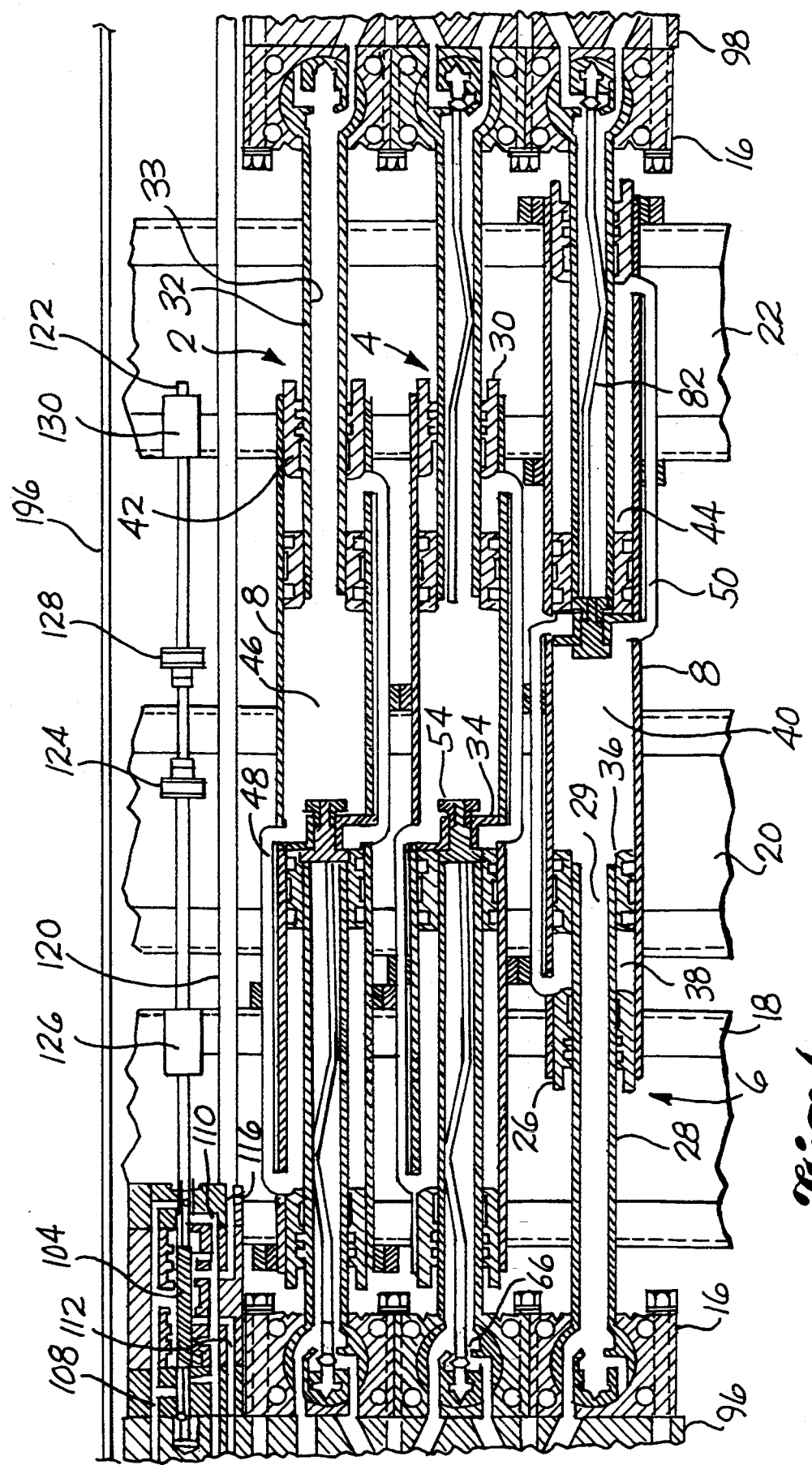
Figure 7:
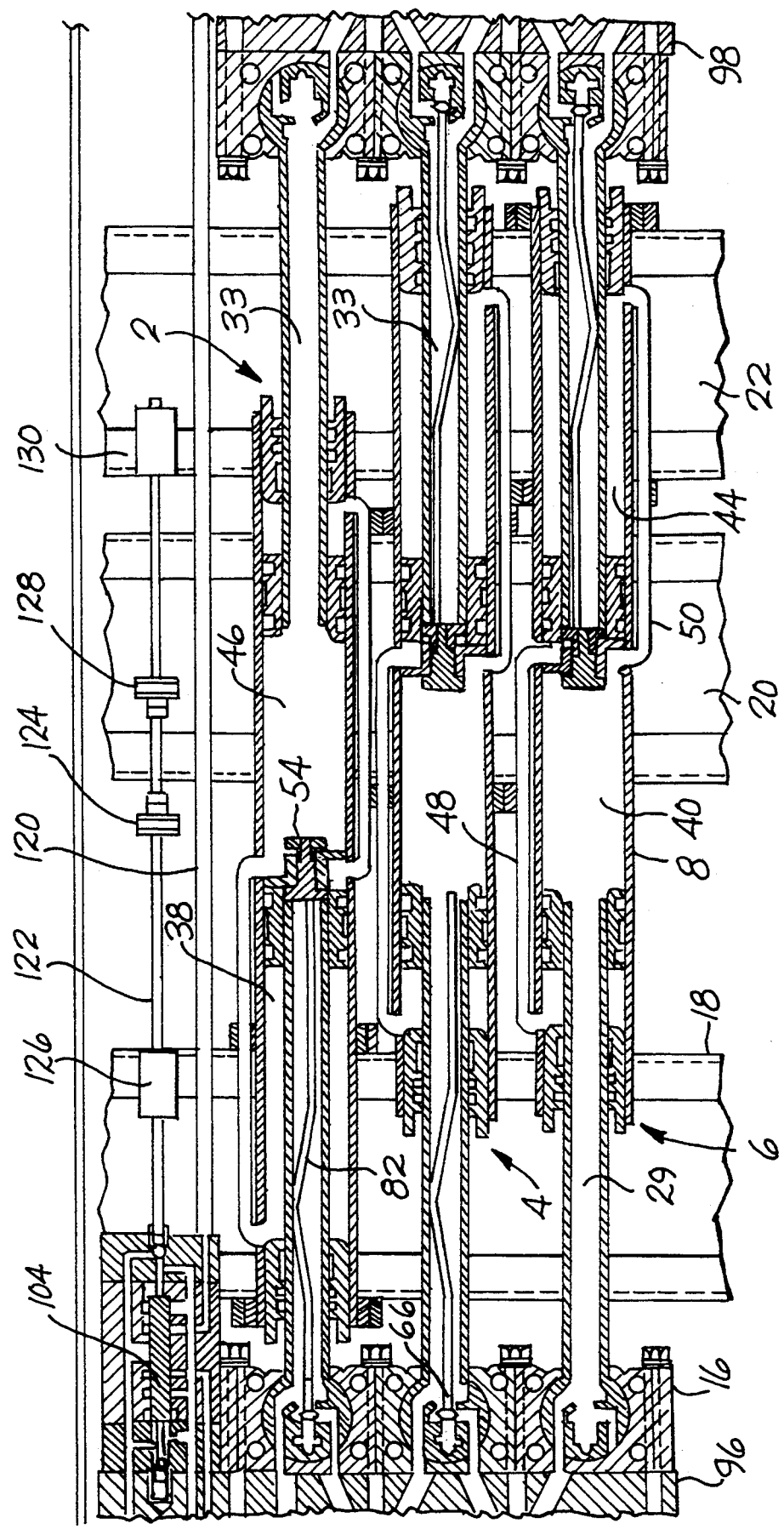

When the third cylinder 8 reaches its rearward position shown in FIG. 6, it opens the check valve 66 in the rear end of the third motor 6 to connect the rear end of the second motor 4 to return. This permits the cylinder 8 of the second motor 4 to move rearwardly into the position shown in FIG. 7. As the second cylinder 8 goes through its end of stroke movement, it opens the check valve 66 in the rear end of the second motor 4 to connect the rear end of the first motor 2 to return. This results in rearward movement of the cylinder 8 of the first motor 2. As the cylinder 8 nears the end of its stroke, the abutment 126 carried by the first transverse drive beam 18 engages the abutment 124 on the switching valve control rod 122 to shift the switching valve spool to the position shown in FIG. 8.

FIG. 8 illustrates the system following the completion of the rearward sequential movement of the three cylinders 8. The shifting of the switching valve 104 has connected the forward ends of the motors 2, 4, 6 to return and the rear ends of the motors 2, 4, 6 to pressure. The connections to pressure and return of the rear and forward portions of the motors 2, 4, 6 have the same pattern as the connection to pressure and return of the forward and rear portions, respectively, of the motors 2, 4, 6 shown in FIG. 4, with the connections to the first and third motors 2, 6 being the same as the connections to the third and first motors 6, 2 in FIG. 4. The connections shown in FIG. 8 result in the simultaneous movement of all three cylinders 8 in the forward direction to convey the load forwardly. During the simultaneous movement, the restriction provided by the unload restrictor valves 146 prevents the first motor 2 from moving faster than the other two motors 4, 6. As the cylinders 8 approach the end of their forward stroke, the abutment 130 carried by the third transverse drive beam 22 engages the switching valve's control rod abutment 128 to shift the switching valve back into the position shown in FIGS. 5-7 so that the sequential movement illustrated in FIGS. 5-7 follows. The cycle is repeated until the load has been fully conveyed.

When the conveyor is not in use to move a load, the four-way valve 210 is turned to the off position shown in FIG. 22. In this position, pressure port 212 of the valve 210 is blocked from communication with the other valve ports. Return port 214 is connected to both port 216 and port 218 so that the pressure chamber 232 of on-off relief valve 230 is connected to return via shuttle valve 220. Since bypass chamber 236 of the valve 230 is also connected to return, pressure from pressure line 203 acts on valve plug 238 to open the valve 230. This short-circuits pressure from pressure port P to return port T.

The preceding discussion describes the normal operation of the system. The system also has a protective feature similar to that disclosed in my aforementioned U.S. patent application Ser. No. 08/165,638. This feature prevents damage to the system should the pressure and return ports P, T of the control block 102 be incorrectly connected so that the port P is connected to return and the port T is connected to pressure. Should this occur, regardless of the position of the four-way valve 210, the check valve 244 closes to prevent communication of pressure from port T to the port 214 of four-way valve 210. Pressure in the branch of the line from port T that extends to the return line 110 is communicated to the bypass chamber 236 of the relief valve 230. When the four-way valve 210 is in either its unload position shown in FIG. 20 or its load position shown in FIG. 21, the pressure chamber 232 of the relief valve 230 is connected to return via the shuttle valve 220, port 218 or 216 of four-way valve 210, port 212 of valve 210, and pressure line 202. The ball 228 of the shuttle valve 220 is not seated when the pressure and return connections are made. Before the ball 228 can seat, enough hydraulic fluid moves out of chamber 232 and through the shuttle valve 220 to allow the valve plug 238 of the relief valve 230 to move off its seat. Thereafter, the ball 228 remains unseated. In line 202, restriction of the flow by restrictor 206 is limited by the opening of check valve 208 should pressure build up in the line 202. The result is the opening of the relief valve 230 due to the pressure differential between the bypass chamber 236 and the pressure chamber 232. This allows the pressure from port T to be short-circuited through the relief valve 230 to return via port P. The system will not operate and the operator will be alerted that an incorrect connection has been made.

When the four-way valve 210 is in the off position shown in FIG. 22, communication between port 212 and the other valve ports is blocked by the valve spool. The valve 210 connects both of the ports 216, 218 to the port 214 so that the pressure chamber 232 of relief valve 230 is connected to port 214 via the shuttle valve 220. Escape of fluid from port 214 is prevented by the closed check valve 244. However, enough fluid from chamber 232 moves through the shuttle valve 220 and into line 216 or 218 to the corresponding pilot chamber 164 to allow relief valve 230 to open.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. A control system for a reciprocating floor conveyor of a type having a plurality of floor slats and a plurality of fluid pressure operated drive motors for reciprocating the floor slats, each said motor having opposite forward and rear ends, said system comprising:

a switching valve for alternately connecting said forward and rear ends of the motors to pressure and return to reciprocate the floor slats;

a forward control valve having a closed position in which it blocks direct communication between said switching valve and each of said forward ends other than a first forward end, and a rear control valve having a closed position in which it blocks direct communication between said switching valve and each of said rear ends other than a first rear end, each of said control valves having a pilot chamber; and a four-way valve having first and second ports communicating with pressure and return, respectively, and third and fourth ports communicating with said pilot chambers of said forward and rear control valves, respectively; said four-way valve having a first position in which it connects one of said pilot chambers to pressure and the other of said pilot chambers to return to cause the conveyor to convey a load in a first direction, and a second position in which it connects said one and said other of said pilot chambers to return and pressure, respectively, to cause the conveyor to convey a load in a second opposite direction.

2. The system of claim 1, wherein each of said control valves comprises an elongated valve stem, and a piston and a valve plug carried by and spaced apart longitudinally along said stem, said piston and plug defining a pressure chamber therebetween, said piston separating said pressure chamber from said pilot chamber, and said piston and plug having confronting pressure surfaces with differential pressure surface areas so that, when said pilot chamber is connected to pressure, said valve plug is seated to close said control valve, and when said pilot chamber is connected to return, said valve plug remains unseated to open said control valve.

3. The system of claim 1, comprising a pressure port, a return port, a bypass valve, and a shuttle valve positioned between said bypass valve and said four-way valve; said bypass valve having a bypass passage interconnecting said pressure and return ports, a bypass valve element having a closed position in which it closes said passage, and a pressure chamber; and said shuttle valve having a shuttle valve element freely movable by pressure in either one of said third and fourth ports of said four-way valve to open communication between said one of said third and fourth ports and said pressure chamber to maintain said bypass valve element in its closed position during normal operation of the conveyor.

4. The system of claim 1, comprising a pressure port, a return port, a bypass valve, and a shuttle valve positioned between said bypass valve and said four-way valve; said bypass valve having a bypass passage interconnecting said pressure and return ports, a bypass valve element having a closed position in which it closes said passage, and a pressure chamber; and said shuttle valve having first and second flow passageways extending therethrough and communicating with said third and fourth ports of said four-way valve, respectively, a center passageway interconnecting said flow passageways, an outlet port connected to said pressure chamber and communicating with said center passageway between said flow passageways, and a shuttle valve element positioned in said center passageway and freely movable into first and second opposite seated positions in which it closes communication between said outlet port and said first and second flow passageways, respectively; said shuttle valve element being movable by pressure in either one of said flow passageways to open communication between said one of said flow passageways and said outlet port, to supply pressure to said pressure chamber to maintain said bypass valve element in its closed position during normal operation of the conveyor.

5. A control system for a reciprocating floor conveyor of a type having a plurality of floor slats arranged in sets and groups, each group including adjacent floor slats, one from each set, and a fluid pressure operated drive motor for each set, said motors being positioned adjacent and parallel to each other and each said motor having opposite forward and rear ends, said system comprising:

a forward manifold positioned adjacent to said forward ends of said motors and having a forward control passageway connected to each of said forward ends, and a forward connecting passageway extending between a first one of said forward ends and an adjacent one of said forward ends;

a rear manifold positioned adjacent to said rear ends of said motors and having a rear control passageway connected to each of said rear ends, and a rear connecting passageway extending between a first one of said rear ends and an adjacent one of said rear ends;

a switching valve for alternately connecting said control passageways to pressure and return to reciprocate the floor slats;

in each of said first forward end and said first rear end, an internal control valve positioned to open and close said connecting passageway;

a forward pilot-operated control valve having a closed position in which it blocks communication between said forward control passageway and each of said forward ends other than said first forward end, and a rear pilot-operated control valve having a closed position in which it blocks communication between said rear control passageway and each of said rear ends other than said first rear end, each of said pilot-operated control valves having a pilot chamber; and a four-way valve having first and second ports communicating with pressure and return, respectively, and third and fourth ports communicating with said pilot chambers of said forward and rear pilot-operated control valves, respectively; said four-way valve having a first position in which it connects one of said pilot chambers to pressure and the other of said pilot chambers to return to close and open said forward and rear pilot-operated control valves, respectively, to cause the conveyor to convey a load in a first direction, and a second position in which it connects said one and said other of said pilot chambers to return and pressure, respectively, to close and open said rear and forward pilot-operated control valves, respectively, to cause the conveyor to convey a load in a second opposite direction.

6. The system of claim 5, wherein each of said pilot-operated control valves comprises an elongated valve stem, and a piston and a valve plug carried by and spaced apart longitudinally along said stem, said piston and plug defining a pressure chamber therebetween, said piston separating said pressure chamber from said pilot chamber, and said piston and plug having confronting pressure surfaces with differential pressure surface areas so that, when said pilot chamber is connected to pressure, said valve plug is seated to close said pilot-operated control valve, and when said pilot chamber is connected to return, said valve plug remains unseated to open said pilot-operated control valve.

7. The system of claim 6, wherein said switching valve and said four-way valve are mounted on one of said manifolds, and said forward and rear pilot-operated control valves are integrated into said forward and rear manifolds, respectively, to minimize external fluid connections in said system.

8. The system of claim 5, wherein said switching valve and said four-way valve are mounted on one of said manifolds, and said forward and rear pilot-operated control valves are integrated into said forward and rear manifolds, respectively, to minimize external fluid connections in said system.

9. The system of claim 5, comprising a pressure port, a return port, a bypass valve, and a shuttle valve positioned between said bypass valve and said four-way valve; said bypass valve having a bypass passage interconnecting said pressure and return ports, a bypass valve element having a closed position in which it closes said passage, and a pressure chamber; and said shuttle valve having a shuttle valve element freely movable by pressure in either one of said third and fourth ports of said four-way valve to open communication between said one of said third and fourth ports and said pressure chamber to maintain said bypass valve element in its closed position during normal operation of the conveyor.

10. The system of claim 5, comprising a pressure port, a return port, a bypass valve, and a shuttle valve positioned between said bypass valve and said four-way valve; said bypass valve having a bypass passage interconnecting said pressure and return ports, a bypass valve element having a closed position in which it closes said passage, and a pressure chamber; and said shuttle valve having first and second flow passageways extending therethrough and communicating with said third and fourth ports of said four-way valve, respectively, a center passageway interconnecting said flow passageways, an outlet port connected to said pressure chamber and communicating with said center passageway between said flow passageways, and a shuttle valve element positioned in said center passageway and freely movable into first and second opposite seated positions in which it closes communication between said outlet port and said first and second flow passageways, respectively; said shuttle valve element being movable by pressure in either one of said flow passageways to open communication between said one of said flow passageways and said outlet port, to supply pressure to said pressure chamber to maintain said bypass valve element in its closed position during normal operation of the conveyor.

11. A control system for a reciprocating floor conveyor of a type having a plurality of floor slats arranged in three sets and a plurality of groups, each group including three adjacent floor slats, one from each set, and first, second, and third fluid pressure operated drive motors, one for each set, said motors being positioned adjacent and parallel to each other and each said motor having opposite forward and rear ends, said system comprising:

a forward manifold positioned adjacent to said forward ends of said motors and having a forward control passageway connected to each of said forward ends, and a forward connecting passageway extending between each adjacent pair of said forward ends;

a rear manifold positioned adjacent to said rear ends of said motors and having a rear control passageway connected to each of said rear ends, and a rear connecting passageway extending between each adjacent pair of said rear ends;

a switching valve for alternately connecting said control passageways to pressure and return to reciprocate the floor slats;

in each of said forward ends of said first and second motors and said rear ends of said second and third motors, an internal control valve, said internal control valves being positioned to open and close said connecting passageway;

a forward pilot-operated control valve having a closed position in which it blocks communication between said forward control passageway and said forward ends of said second and third motors, and a rear pilot-operated control valve having a closed position in which it blocks communication between said rear control passageway and said rear ends of said first and second motors, each of said pilot-operated control valves having a pilot chamber; and a four-way valve having first and second ports communicating with pressure and return, respectively, and third and fourth ports communicating with said pilot chambers of said forward and rear pilot-operated control valves, respectively; said four-way valve having a first position in which it connects one of said pilot chambers to pressure and the other of said pilot chambers to return to close said forward pilot-operated control valve and allow said rear pilot-operated control valve to open, to cause the conveyor to convey a load in a first direction, and a second position in which it connects said one and said other of said pilot chambers to return and pressure, respectively, to close said rear pilot-operated control valve and allow said forward pilot-operated control valve to open, to cause the conveyor to convey a load in a second opposite direction.

12. The system of claim 11, wherein each of said pilot-operated control valves comprises an elongated valve stem, and a piston and a valve plug carried by and spaced apart longitudinally along said stem, said piston and plug defining a pressure chamber therebetween, said piston separating said pressure chamber from said pilot chamber, and said piston and plug having confronting pressure surfaces with differential pressure surface areas so that, when said pilot chamber is connected to pressure, said valve plug is seated to close said pilot-operated control valve, and when said pilot chamber is connected to return, said valve plug remains unseated to open said pilot-operated control valve.

13. The system of claim 12, wherein said switching valve and said four-way valve are mounted on one of said manifolds, and said forward and rear pilot-operated control valves are integrated into said forward and rear manifolds, respectively, to minimize external fluid connections in said system.

14. The system of claim 11, wherein said switching valve and said four-way valve are mounted on one of said manifolds, and said forward and rear pilot-operated control valves are integrated into said forward and rear manifolds, respectively, to minimize external fluid connections in said system.

15. The system of claim 11, comprising a pressure port, a return port, a bypass valve, and a shuttle valve positioned between said bypass valve and said four-way valve; said bypass valve having a bypass passage interconnecting said pressure and return ports, a bypass valve element having a closed position in which it closes said passage, and a pressure chamber; and said shuttle valve having a shuttle valve element freely movable by pressure in either one of said third and fourth ports of said four-way valve to open communication between said one of said third and fourth ports and said pressure chamber to maintain said bypass valve element in its closed position during normal operation of the conveyor.

16. The system of claim 11, comprising a pressure port, a return port, a bypass valve, and a shuttle valve positioned between said bypass valve and said four-way valve; said bypass valve having a bypass passage interconnecting said pressure and return ports, a bypass valve element having a closed position in which it closes said passage, and a pressure chamber; and said shuttle valve having first and second flow passageways extending therethrough and communicating with said third and fourth ports of said four-way valve, respectively, a center passageway interconnecting said flow passageways, an outlet port connected to said pressure chamber and communicating with said center passageway between said flow passageways, and a shuttle valve element positioned in said center passageway and freely movable into first and second opposite seated positions in which it closes communication between said outlet port and said first and second flow passageways, respectively; said shuttle valve element being movable by pressure in either one of said flow passageways to open communication between said one of said flow passageways and said outlet port, to supply pressure to said pressure chamber to maintain said bypass valve element in its closed position during normal operation of the conveyor.

* * * * *